US010839194B2

United States Patent
Jung et al.

(10) Patent No.: US 10,839,194 B2
(45) Date of Patent: Nov. 17, 2020

(54) ELECTRONIC DEVICE INCLUDING WATERPROOF STRUCTURE OF SENSOR KEY ASSEMBLY

(71) Applicant: Samsung Electronics Co., Ltd., Gyeonggi-do (KR)

(72) Inventors: Yanggyun Jung, Gyeonggi-do (KR); Jaeil Seo, Gyeonggi-do (KR); Hosung Bang, Gyeonggi-do (KR); Jihoon Kim, Gyeonggi-do (KR); Jeong Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/792,383

(22) Filed: Feb. 17, 2020

(65) Prior Publication Data

US 2020/0265212 A1 Aug. 20, 2020

(30) Foreign Application Priority Data

Feb. 18, 2019 (KR) ........................ 10-2019-0018387

(51) Int. Cl.
*G06K 9/00* (2006.01)
*H04B 1/3888* (2015.01)
(Continued)

(52) U.S. Cl.
CPC ........... *G06K 9/00053* (2013.01); *H01H 9/04* (2013.01); *H04B 1/3888* (2013.01);
(Continued)

(58) Field of Classification Search
CPC combination set(s) only.
See application file for complete search history.

(56) References Cited

U.S. PATENT DOCUMENTS 9,155,367 B2 * 10/2015 Fathollahi ............ H04B 1/3888
9,392,854 B2 * 7/2016 Fathollahi ................ H05K 5/02
(Continued)

FOREIGN PATENT DOCUMENTS

JP 2009-188488 A 8/2009
KR 10-2015-0099295 A 8/2015
(Continued)

OTHER PUBLICATIONS

International Search Report dated Jun. 10, 2020.

*Primary Examiner* — Lisa Lea-Edmonds
(74) *Attorney, Agent, or Firm* — Cha & Reiter, LLC.

(57) ABSTRACT

An electronic device according to the disclosure may include: a housing including a first plate oriented in a first direction, a second plate oriented in a second direction, and a side member oriented in a third direction, the side member surrounding at least a portion of a space defined between the first and second plates, a printed circuit board disposed between the first and second plates, a support member supporting the printed circuit board and coupled to at least a portion of the side member, a fingerprint sensor key exposed on at least a portion of the side member, and electrically connected to the printed circuit board using a flexible circuit board, and at least one waterproof structure mounted on the support member sealing a second space in which the printed circuit board is located from a first space in which the fingerprint sensor key assembly is located.

20 Claims, 26 Drawing Sheets

(51) Int. Cl.
*H04M 1/02* (2006.01)
*H01H 9/04* (2006.01)
*H04B 1/38* (2015.01)

(52) U.S. Cl.
CPC ... *H04M 1/0277* (2013.01); *H04B 2001/3894* (2013.01); *H04M 2250/22* (2013.01)

(56) References Cited

U.S. PATENT DOCUMENTS

| | | | |
|---|---|---|---|
| 9,578,759 B2 * | 2/2017 | Seo | H04M 1/0202 |
| 9,871,330 B2 * | 1/2018 | Seo | G06F 1/1662 |
| 9,872,408 B2 * | 1/2018 | Choi | H04M 1/18 |
| 9,930,799 B2 * | 3/2018 | Moon | H04M 1/18 |
| 9,953,775 B2 * | 4/2018 | Kim | H01H 13/063 |
| 9,992,893 B2 * | 6/2018 | Choi | G06F 1/1637 |
| 10,109,946 B2 * | 10/2018 | Lee | H01R 13/5219 |
| 10,134,540 B2 * | 11/2018 | Choi | G06F 1/1637 |
| 10,206,470 B2 * | 2/2019 | Fathollahi | A45C 11/00 |
| 10,405,446 B2 * | 9/2019 | Choi | H05K 5/03 |
| 10,424,445 B2 * | 9/2019 | Kim | H01H 13/86 |
| 10,694,013 B2 * | 6/2020 | Lee | H04M 1/18 |
| 10,709,051 B2 * | 7/2020 | Cho | H05K 13/0486 |
| 2006/0034499 A1 * | 2/2006 | Shinoda | H04M 1/66 |
| | | | 382/124 |
| 2015/0071510 A1 | 3/2015 | Kim et al. | |
| 2015/0245514 A1 * | 8/2015 | Choung | H05K 5/0247 |
| | | | 361/749 |
| 2016/0324286 A1 * | 11/2016 | Fathollahi | H05K 5/03 |
| 2017/0135239 A1 | 5/2017 | Hyun et al. | |
| 2017/0213665 A1 | 7/2017 | Weber et al. | |
| 2018/0206607 A1 * | 7/2018 | Rayner | A45C 11/00 |
| 2019/0259551 A1 * | 8/2019 | Cha | H04B 1/3827 |
| 2020/0252492 A1 * | 8/2020 | Choi | H05K 5/0086 |

FOREIGN PATENT DOCUMENTS

| | | |
|---|---|---|
| KR | 10-1830964 B1 | 4/2018 |
| KR | 10-2018-0049916 A | 5/2018 |
| KR | 10-2018-0066522 A | 6/2018 |

\* cited by examiner

ELECTRONIC DEVICE INCLUDING WATERPROOF STRUCTURE OF SENSOR KEY ASSEMBLY

CROSS-REFERENCE TO RELATED APPLICATION(S)

This application is based on and claims priority under 35 U.S.C. 119 to Korean Patent Application No. 10-2019-0018387, filed on Feb. 18, 2019, in the Korean Intellectual Property Office, the disclosure of which is herein incorporated by reference in its entirety.

BACKGROUND

1) Field

Certain embodiments relate to a sensor key assembly of an electronic device and a waterproof structure of the sensor key assembly.

2) Description of Related Art

Modern electronic devices such as smartphones, portable devices, personal computers, tablets and the like often include actuatable keys and a variety of sensors. The sensors, such as a fingerprint sensor, may be arranged on any surface of the housing, including front, rear and side faces thereof. The keys may include a volume key, power key, home key, and other keys, which may also be disposed on front, rear or side faces of the housing.

One such electronic device may, for example, include a fingerprint sensor disposed in a region for a home key (e.g., on a front face of the device) and/or include a camera disposed on a rear face of the device.

The above information is presented as background information only to assist with an understanding of the disclosure. No determination has been made, and no assertion is made, as to whether any of the above might be applicable as prior art with regard to the disclosure.

SUMMARY

When a fingerprint sensor is disposed on an electronic device, certain placements may cause issues with other features. For example, fingerprint sensors may be placed on a front surface of the device, near keys disposed on the front surface, or on a rear of the device, such as near a rear-facing camera. However, if the sensor is disposed on a side face of the housing, it may be difficult to implement a waterproof mechanical key for the fingerprint sensor, and retain a desirable aesthetic design for the device, due to the physical constraints imposed by the arrangement.

Other aspects of the device may be impacted. For example, by placing the fingerprint sensor on a side face, the usability of the fingerprint sensor may degrade, as inconvenience may arise. For example, to use the fingerprint sensor in such a placement, it may be necessary to hold the electronic device with one hand and operate the fingerprint sensor with the other hand.

Furthermore, mounting the fingerprint sensor on a side member may utilize a certain placement of a corresponding flexible circuit board, which in turn utilizes certain electrical connections to a printed circuit board internal to the device. Structure requirements of these components (e.g., for mounting and housing) may introduce further physical obstacles to providing waterproofing for the device.

Certain embodiments may provide an electronic device in which a fingerprint sensor is disposed on a side key disposed on a side member of a housing and a waterproof structure is mounted therein.

Certain embodiments may provide an electronic device in which a fingerprint sensor is disposed on a side key disposed on a side member of a housing, the fingerprint sensor being capable of being operated by one hand in the state in which the electronic device is held using the one hand.

Certain embodiments may provide an electronic device, in which a fingerprint sensor is disposed on a side key disposed on a side member of a housing and a waterproof structure is mounted therein in consideration of the appearance design and the thickness of the electronic device.

An electronic device according to certain embodiments may include: a housing including a first plate oriented in a first direction, a second plate oriented in a second direction opposite the first direction, and a side member oriented in a third direction that is perpendicular to both the first and second directions, the side member surrounding at least a portion of a space defined between the first and second plates, a display panel visible through at least a portion of the first plate, a printed circuit board disposed between the display panel and the second plate, a support member having a first face oriented in the first direction and supporting the display panel, and a second face oriented in the second direction and supporting the printed circuit board, the support member coupled to at least a portion of the side member, a sensor key assembly disposed on at least a portion of the side member such that at least a partial face of a sensor of the sensor key is exposed to the at least the portion of the side member, mounted on the first face of the support member, and electrically connected to the printed circuit board using a flexible circuit board, a key assembly structure including the sensor key assembly disposed on the support member, so as to enable operation of the sensor key, and at least one waterproof structure mounted on the second face of the support member sealing a second space defined in the housing in which the printed circuit board is located, the second space sealed from a first space defined in the housing in which the sensor key assembly is located.

An electronic device according to certain embodiments may include: a housing including a first plate oriented in a first direction, a second plate oriented in a second direction that is opposite the first direction, and a side member oriented in a third direction that is perpendicular to both of the first and second directions, the side member surrounding at least a portion of a space defined between the first and second plates, a printed circuit board disposed between the first and second plates, a support member supporting the printed circuit board and coupled to at least a portion of the side member, a fingerprint sensor key assembly disposed such that a sensing face of the fingerprint sensor is exposed on at least a portion of the side member, and electrically connected to the printed circuit board using a flexible circuit board, and at least one waterproof structure mounted on the support member sealing a second space in which the printed circuit board is located from a first space in which the fingerprint sensor key assembly is located.

According to the disclosure, by mounting the fingerprint sensor on the side key of the housing, it may be convenient to hold the electronic device and operate the fingerprint sensor using one hand.

According to the disclosure, even when the fingerprint sensor is mounted on the side key of the housing and the waterproof structure of the mounted fingerprint sensor is implemented, there are no restrictions with regard to appearance design and it is possible to implement a slim electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
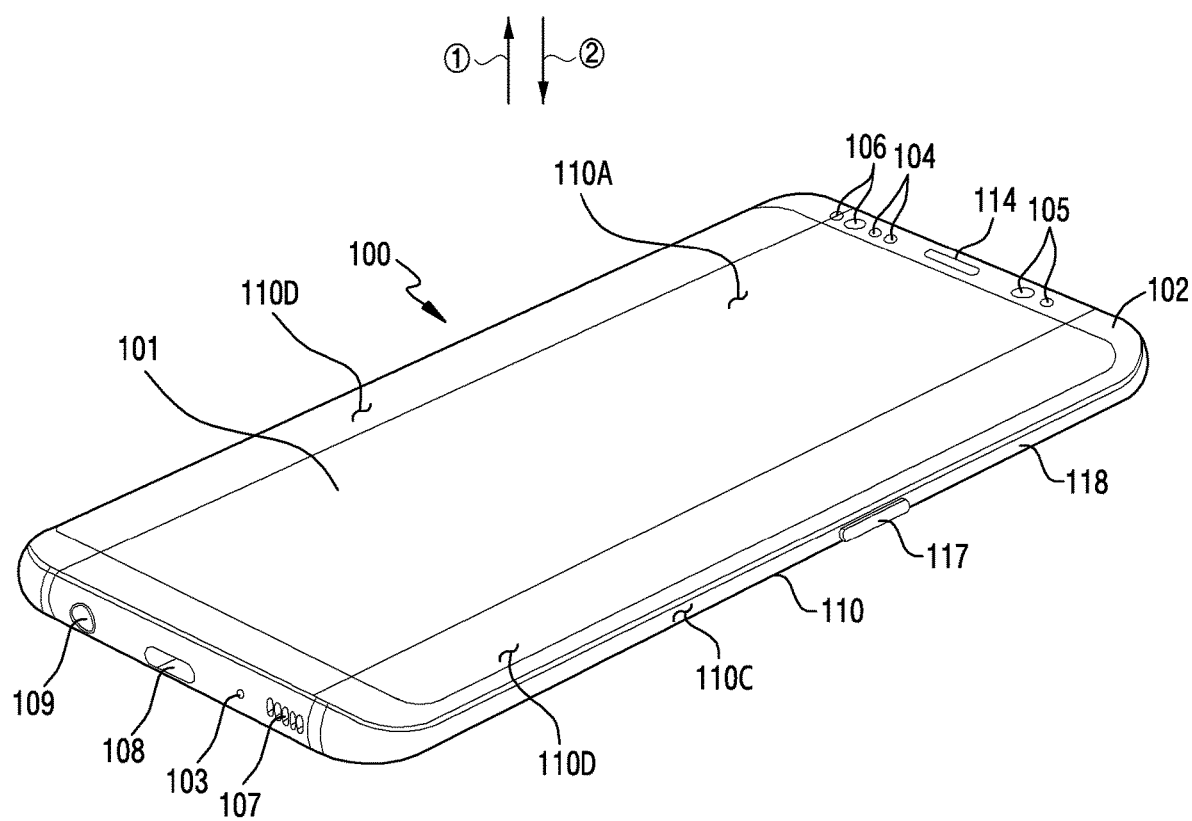
FIG. 1 is a perspective view illustrating the front face of an electronic device according to certain embodiments.

Hereinafter, certain embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smart watch).

Figure 2:
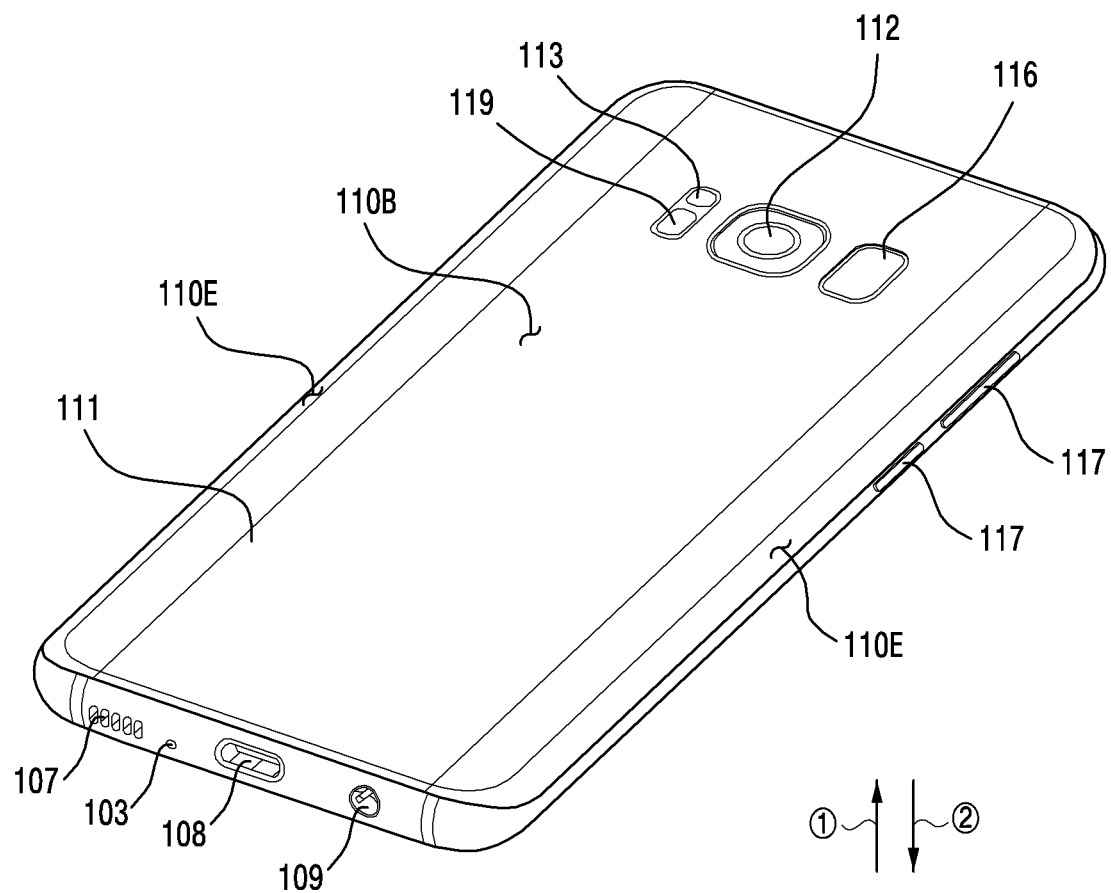
FIG. 2 is a perspective view illustrating the rear face of the electronic device of FIG. 1.

FIG. 1 is a perspective view illustrating the front face of a mobile electronic device according to an embodiment. FIG. 2 is a perspective view illustrating the rear face of the electronic device of FIG. 1.

Referring to FIGS. 1 and 2, an electronic device 100 according to an embodiment may include: a housing 110 including a first face (or a front face) 110A, a second face (or a rear face) 110B, and a side face 110C surrounding a space between the first face 110A and the second face 110B. In another embodiment (not illustrated), the term, housing, may refer to a structure forming some of the first face 110A, the second face 110B, and the side face 110C of FIG. 1. According to an embodiment, at least a portion of the first face 110A may be formed by a substantially transparent front plate 102 (e.g., a glass plate or a polymer plate including various coating layers). The second face 110B may be formed of a substantially opaque rear plate 111. The rear plate 111 may be formed of, for example, coated or colored glass, ceramic, a polymer, or a metal (e.g., aluminum, stainless steel (STS), or magnesium), or a combination of two or more of these materials. The side faces 110C may be formed by a side bezel structure (or a "side member") 118 coupled to the front plate 102 and the rear plate 111 and including a metal and/or a polymer. In some embodiments, the rear plate 111 and the side bezel structure 118 may be integrally formed, and may include the same material (e.g., a metal material such as aluminum).

In the illustrated embodiment, the front plate 102 may include two first areas 110D, which are bent from the first face 110A toward the rear plate 111 and extend seamlessly, at the long opposite side edges thereof. In the illustrated embodiment (see FIG. 2), the rear plate 111 may include two second areas 110E, which are bent from the second face 110B toward the front plate 102 and extend seamlessly, at the long opposite side edges thereof. In some embodiments, the front plate 102 (or the rear plate 111) may include one of the first areas 110D (or one of the second areas 110E). In another embodiment, some of the first areas 110D and the second areas 110E may not be included. In the above embodiments, when viewed from a side of the electronic device 100, the side bezel structure 118 may have a first thickness (or width) on the side faces, which do not include the first areas 110D or the second areas 110E, and may have a second thickness (or width), which is thinner than the first thickness, on the side faces which include the first areas 110D or the second areas 110E.

According to an embodiment, the electronic device 100 may include at least one of a display 101, audio modules 103, 107, and 114, sensor modules 104, 116, and 119, camera modules 105, 112, and 113, key input devices 117, light-emitting elements 106, and connector holes 108 and 109. In some embodiments, in the electronic device 100, at least one of the components ((e.g., the key input devices 117 or the light-emitting element 106) may be omitted, or other components may be additionally included.

The display 101 may be exposed through, for example, a large portion of the front plate 102. In some embodiments, at least a part of the display 101 may be exposed through the front plate 102 forming the first face 110A and the first areas 110D of the side faces 110C. In some embodiments, the edges of the display 101 may be formed to be substantially the same as the contour shape of the front plate 102 adjacent thereto. In another embodiment (not illustrated), the distance between the outer contour of the display 101 and the outer contour of the front plate 102 may be substantially constant in order to enlarge the exposed area of the display 101.

In another embodiment (not illustrated), a recess or an opening is formed in a part of a screen display area of the display 101, and at least one of an audio module 114, a module 104, a camera module 105, and a light-emitting element 106 may be aligned with the recess or the opening. In another embodiment (not illustrated), at least one of the audio module 114, the sensor module 104, the camera module 105, the fingerprint sensor 116, and the light-emitting element 106 may be included in the rear face of the screen display area of the display 101. In another embodiment (not illustrated), the display 101 may be coupled to or disposed adjacent to a touch-sensing circuit, a pressure sensor capable of measuring the intensity of the touch (pressure), and/or a digitizer that detects a stylus pen. In some embodiments, at least some of the sensor modules 104 and 119 and/or at least some of the key input devices 117 may be disposed in the first areas 110D and/or the second areas 110E.

The audio modules 103, 107, and 114 may include a microphone hole and speaker holes. The microphone hole may include a microphone disposed therein so as to acquire external sound, and in some embodiments, multiple microphones may be disposed therein so as to detect the direction of sound. The speaker holes may include an external speaker hole and a phone call receiver hole. In some embodiments, the speaker holes and the microphone hole may be implemented as a single hole, or a speaker may be included without the speaker holes (e.g., a piezo speaker).

The sensor modules 104, 116, and 119 may generate electrical signals or data values corresponding to an internal operating state or an external environmental condition of the electronic device 100. The sensor modules 104,116, and 119 may include, for example, a first sensor module 104 (e.g., a proximity sensor) and/or a second sensor module (not illustrated) (e.g., a fingerprint sensor) disposed on the first face 110A of the housing 110, and/or a third sensor module 119 (e.g., an HRM sensor) and/or a fourth sensor module 116 (e.g., a fingerprint sensor) disposed on the second face 110B of the housing 110. The fingerprint sensor may be disposed not only on the first face 110A of the housing 110 (e.g., the display 101), but also on the second face 110B. The electronic device 100 may further include at least one of sensor modules (not illustrated) such as a gesture sensor, a gyro sensor, an air pressure sensor, a magnetic sensor, an acceleration sensor, a grip sensor, a color sensor, an infrared (IR) sensor, a biosensor, a temperature sensor, a humidity sensor, and an illuminance sensor.

The camera modules 105, 112, and 113 may include a first camera device 105 disposed on the first face 110A of the electronic device 100 and a second camera device 112 disposed on the second face 110B, and/or a flash 113. The camera devices 105 and 112 may include one or more lenses, an image sensor, and/or an image signal processor. The flash 113 may include, for example, a light-emitting diode or a xenon lamp. In some embodiments, two or more lenses (e.g., an infrared camera lens, a wide-angle lens, and a telephoto lens) and image sensors may be disposed on one face of the electronic device 100.

The key input devices 117 may be disposed on the side face 110C of the housing 110. In another embodiment, the electronic device 100 may not include some or all of the above-mentioned key input devices 117, and a key input device 117, which is not included therein, may be implemented in another form such as a soft key on the display 101. In some embodiments, the key input devices may include a sensor module 116 disposed on the second face 110B of the housing 110.

The light-emitting element 106 may be disposed, for example, on the first face 110A of the housing 110. The light-emitting element 106 may provide, for example, the status information of the electronic device 100 in an optical form. In another embodiment, the light-emitting element 106 may provide a light source that is interlocked with, for example, the operation of the camera module 105. The light-emitting element 106 may include, for example, an LED, an IR LED, and a xenon lamp.

The connector holes 108 and 109 may include a first connector hole 108 capable of accommodating a connector (e.g., a USB connector) for transmitting and receiving power and/or data to and from an external electronic device, and/or a second connector hole 109 capable of receiving a connector (e.g., an earphone jack) for transmitting and receiving an audio signal to and from an external electronic device.

Figure 3:
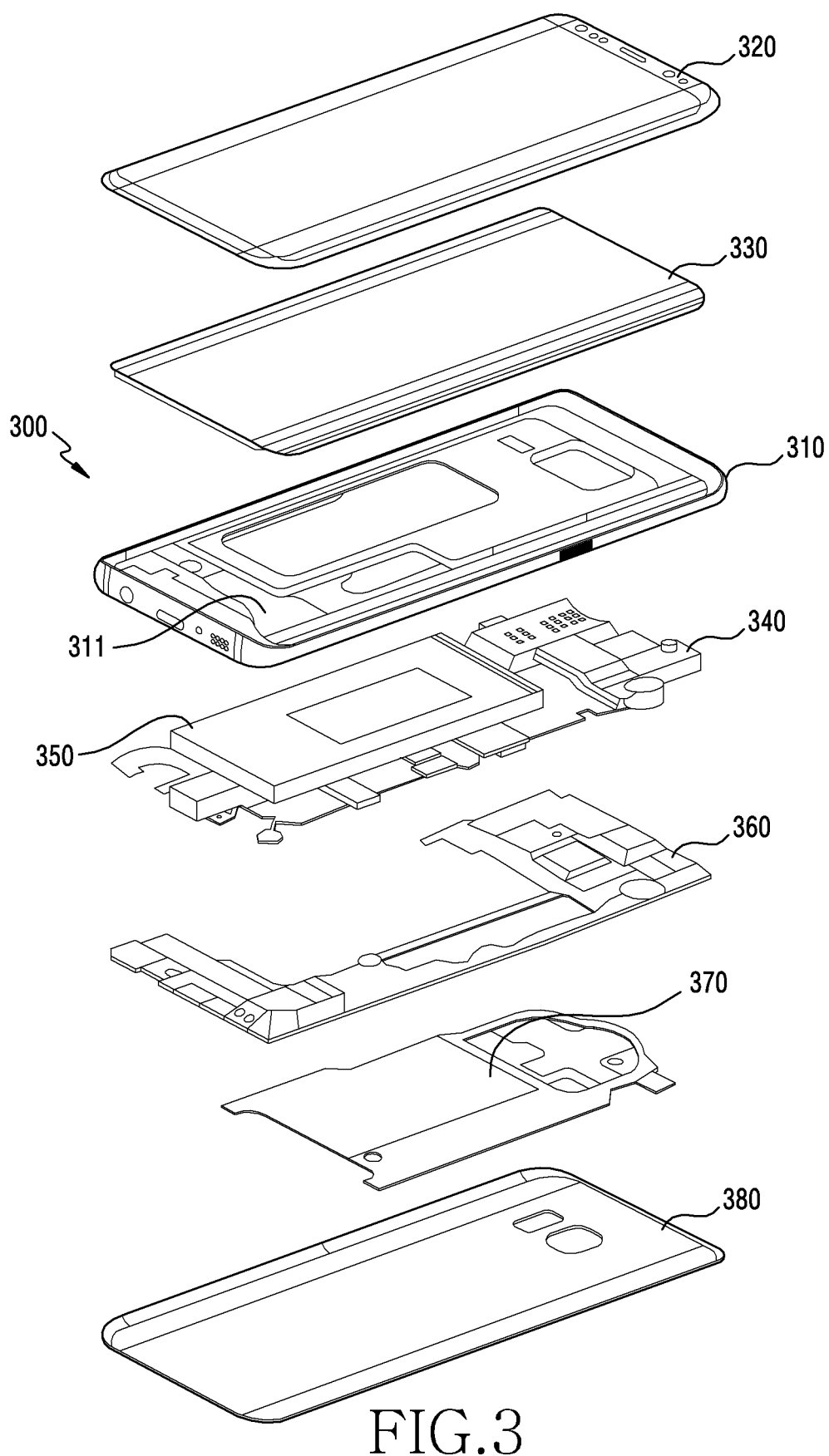
FIG. 3 is an exploded perspective view illustrating the internal configuration of the electronic device of FIG. 1.

FIG. 3 is an exploded perspective view illustrating the internal configuration of the electronic device of FIG. 1.

Referring to FIG. 3, an electronic device 300 may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, at least one of the components (e.g., the first support member 311 or the second support member 360) may be omitted from the electronic device 300, or the electronic device 300 may additionally include other components. At least one of the components of the electronic device 300 may be the same as or similar to at least one of the components of the electronic device 300 of FIG. 1 or 2, and a redundant description thereof is omitted below.

The first support member 311 may be disposed inside the electronic device 300 and connected to the side bezel structure 310 or may be formed integrally with the side bezel structure 310. The first support member 311 may be formed of, for example, a metal material and/or a non-metal (e.g., polymer) material. The display 330 may be coupled to one face of the first support member 311, and the printed circuit board 340 may be coupled to the other face of the first support member 332. On the printed circuit board 340, a processor, a memory, and/or an interface may be mounted. The processor may include at least one of, for example, a central processing unit, an application processor, a graphic processor, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/an MMC connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed to be substantially flush with, for example, the printed circuit board 340. The battery 350 may be integrally disposed within the electronic device 300, or may be mounted to be detachable from the electronic device 300.

The antenna 370 may be disposed between the rear plate 380 and the display 330. The antenna 370 may include, for example, a near-field Communication (NFC) antenna, a wireless charging antenna, and/or a magnetic secure transmission (MST) antenna. The antenna 370 may perform short-range communication with, for example, an external device, or may transmit/receive power for charging in a wireless manner to/from the external device. In another embodiment, an antenna structure may be formed by the side bezel structure 310, a part of the first support member 311, or a combination thereof.

Figure 4:
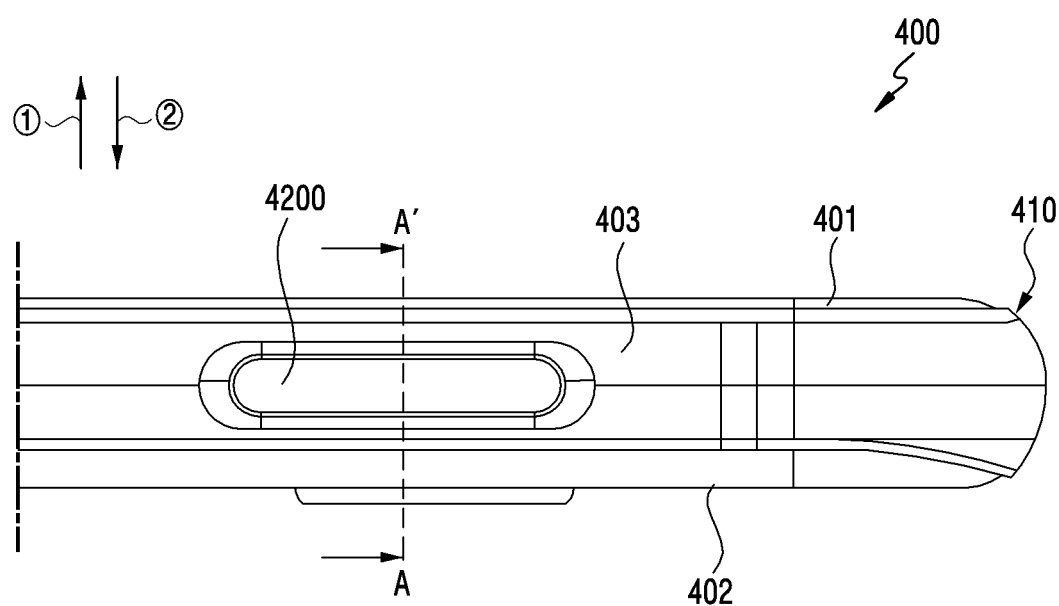
FIG. 4 is a side view illustrating a part of an electronic device according to certain embodiments.
Figure 5A:
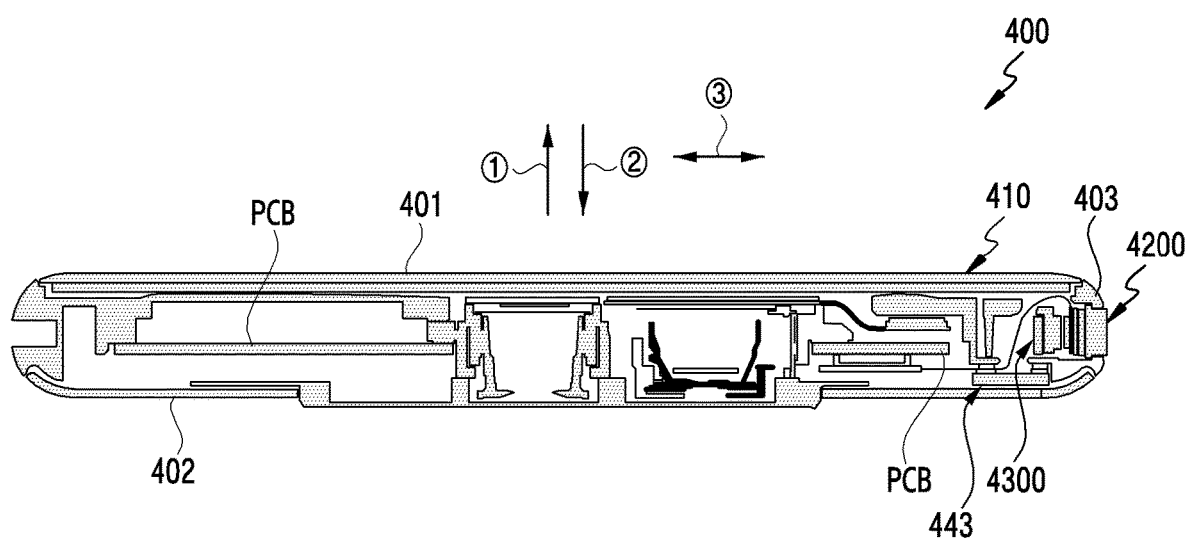
FIG. 5A is a cross-sectional view taken along line A-A' in FIG. 4.
Figure 5B:
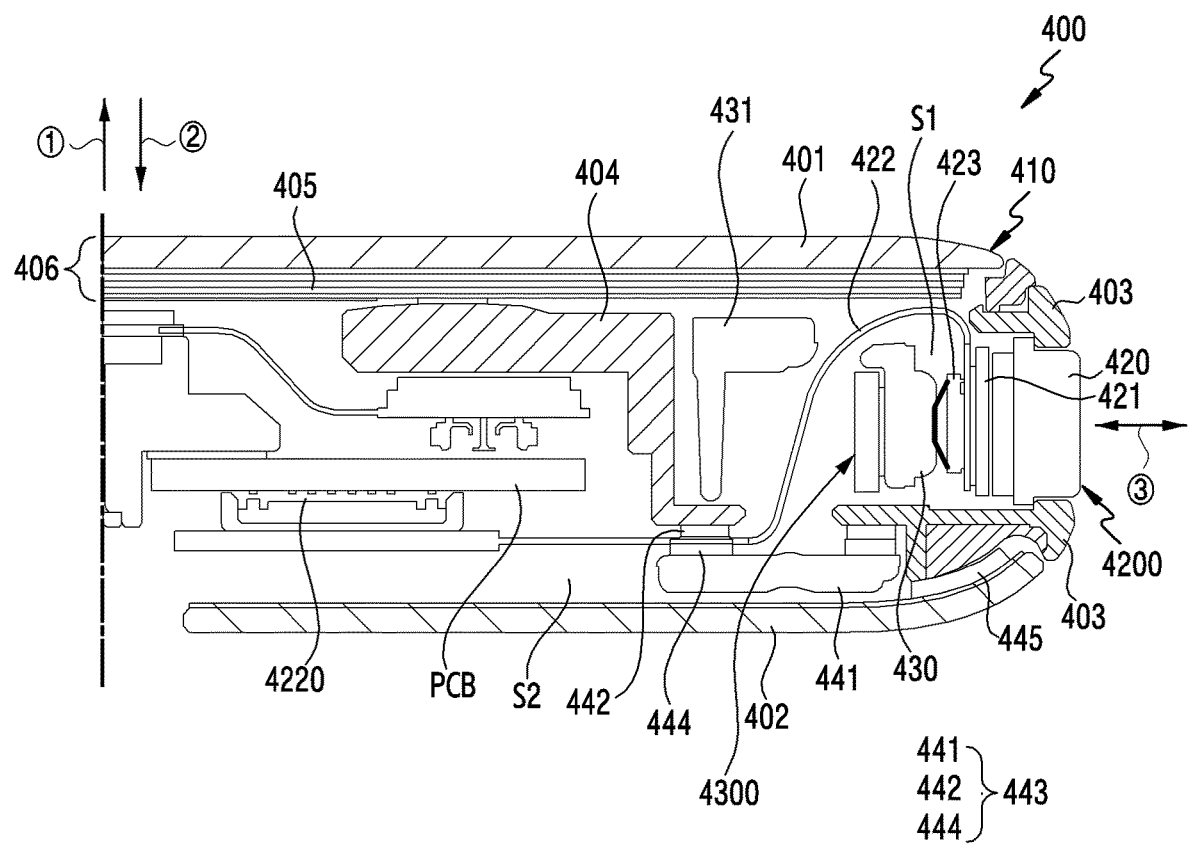
FIG. 5B is an enlarged view of a part of FIG. 5A.

FIG. 4 is a side view illustrating a part of an electronic device according to certain embodiments. FIG. 5A is a cross-sectional view taken along line A-A' in FIG. 4. FIG. 5B is an enlarged view of a part of FIG. 5A.

Referring to FIGS. 4 to 5B, an electronic device 400 (e.g., the electronic device 100 in FIGS. 1 and 2) may include a housing 410 (e.g., the housing 110 illustrated in FIG. 1). According to an embodiment, the housing 410 may include: a first plate 401 oriented in a first direction ①(e.g., the front plate 102 illustrated in FIG. 1); a second plate 402 (e.g., the rear plate 111 illustrated in FIG. 2) oriented in a second direction ② opposite the first direction ①; and side members 403 (e.g., the side members 118 illustrated in FIG. 1) each oriented in a third direction ③ perpendicular to each of the first and second directions ① and ② and enclosing at least a portion of the space between the first plate 401 and the second plate 402. For example, the side members 403 may be made of a metal material so as to operate as antenna radiators. The side members 403 may include a segmented structure that includes a conductive portion and a non-conductive portion.

According to an embodiment, the electronic device 400 may include a display panel 405 (e.g., the display 101 illustrated in FIG. 1) disposed so as to be visible through at least a portion of the first plate 401. According to an embodiment, a display 406 may include a first plate 401 and a display panel 405 incorporated in the first plate. For example, the display panel 405 may include a touch-sensitive panel so as to operate as a touch screen panel.

According to an embodiment, the housing 410 may include a printed circuit board (PCB) (e.g., the printed circuit board 340 illustrated in FIG. 3) disposed between the display and the second plate 402. The PCB may be disposed to be oriented in the second direction ② of the display panel 405. According to an embodiment, the support member 404 (e.g., the second support member 360 illustrated in FIG. 3) may include a first face oriented in a first direction ① and a second face oriented in a second direction ②. The first face may support the display 406, and the second face may support the PCB. According to an embodiment, the support member 404 may be coupled to at least a portion of a side member 403 so as to form an integral structure with the side member.

According to an embodiment, a sensor key assembly 4200 may be disposed in a portion of the side member 403. The sensor key assembly 4200 is a structure in which a biometric sensor and a key assembly are combined, and may perform a biometric sensor function and a side key function. For example, the biometric sensor may be a fingerprint sensor, and the key may be a side key disposed on the side member of the housing. According to an embodiment, the sensor key assembly 4200 may be electrically connected to the PCB using a separate flexible circuit board 422.

According to an embodiment, the sensor key assembly 4200 may include a fingerprint sensor 420, a circuit board 421, and a dome switch 423. According to an embodiment, the fingerprint sensor 420 may be disposed to at least a partial face thereof to the side member 403. For example, the sensing face of the fingerprint sensor 420 may be a side key top.

The flexible circuit board 422 according to an embodiment is an electrical connection member for connecting the sensor key assembly 4200 to the PCB. One end of the flexible circuit board may be electrically connected to the sensor key assembly 4200, and the other end may be electrically connected to the PCB. The other end of the flexible circuit board 422 may be provided with a connector 4220. The connector 4220 may be connected to the PCB.

According to an embodiment, the housing 410 may include a key assembly structure 4300 for placing the sensor key assembly 4200 between the side member and the support member 404. According to an embodiment, the key assembly structure 4300 is a structure capable of supporting the sensor key assembly 4200 so as to make the same capable of operating, and may include a key bracket 430 and a front dummy 431.

According to an embodiment, the key bracket 430 may be accommodated in a portion of the support member 404 so as to support the movement of the fingerprint sensor in the third direction ③. The sensor key assembly 4200 accommodated in a portion of the housing may be protected by the front dummy 431.

The electronic device 400 according to an embodiment may include one or more waterproof structures 443. The waterproof structures 443 are mounted between the support member 404 and the key assembly structure 4300 so as to seal a gap between a first space s1, in which the sensor key assembly 4200 is located, and a second space s2, in which the PCB is located. The waterproof structure 443 according to an embodiment may include a bottom dummy 441, which spatially separates the first and second spaces s1 and s2, and one or more waterproof tapes 442 and 444. Reference numeral 445 may denote a waterproof tape that seals a gap between the second plate 402 and the support member 404.

Figure 6:
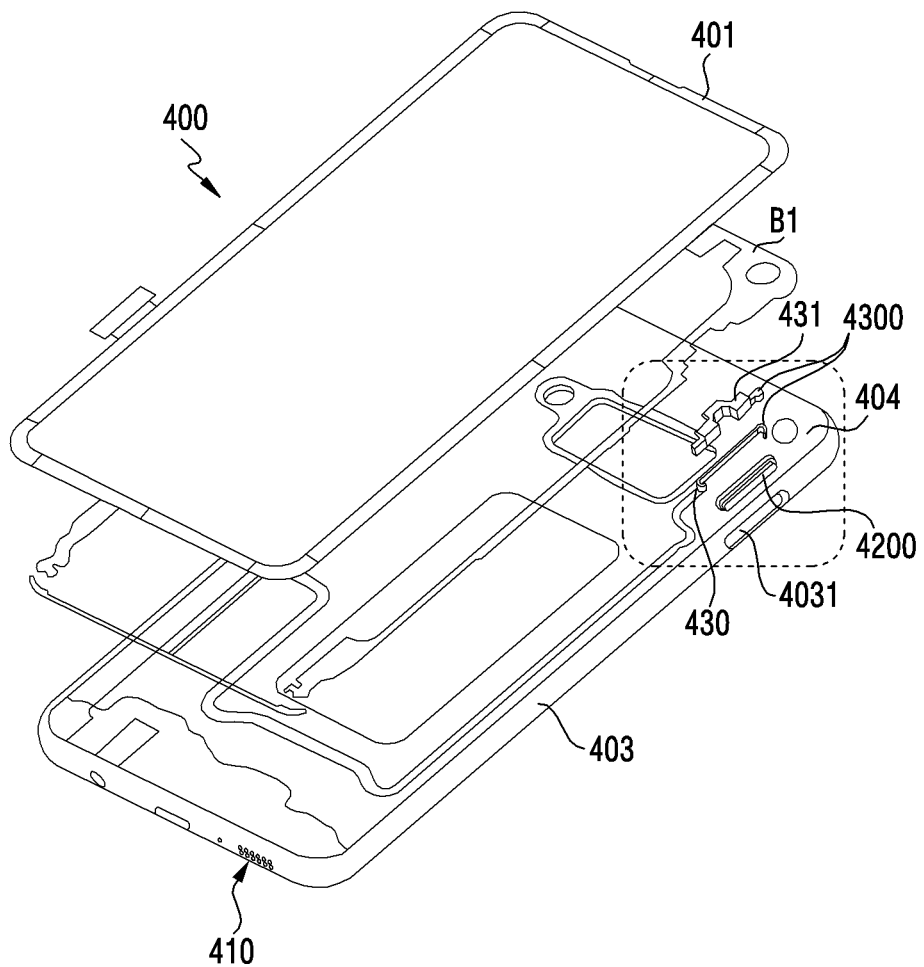
FIG. 6 is a perspective view illustrating a key assembly structure of an electronic device according to certain embodiments.
Figure 7A:
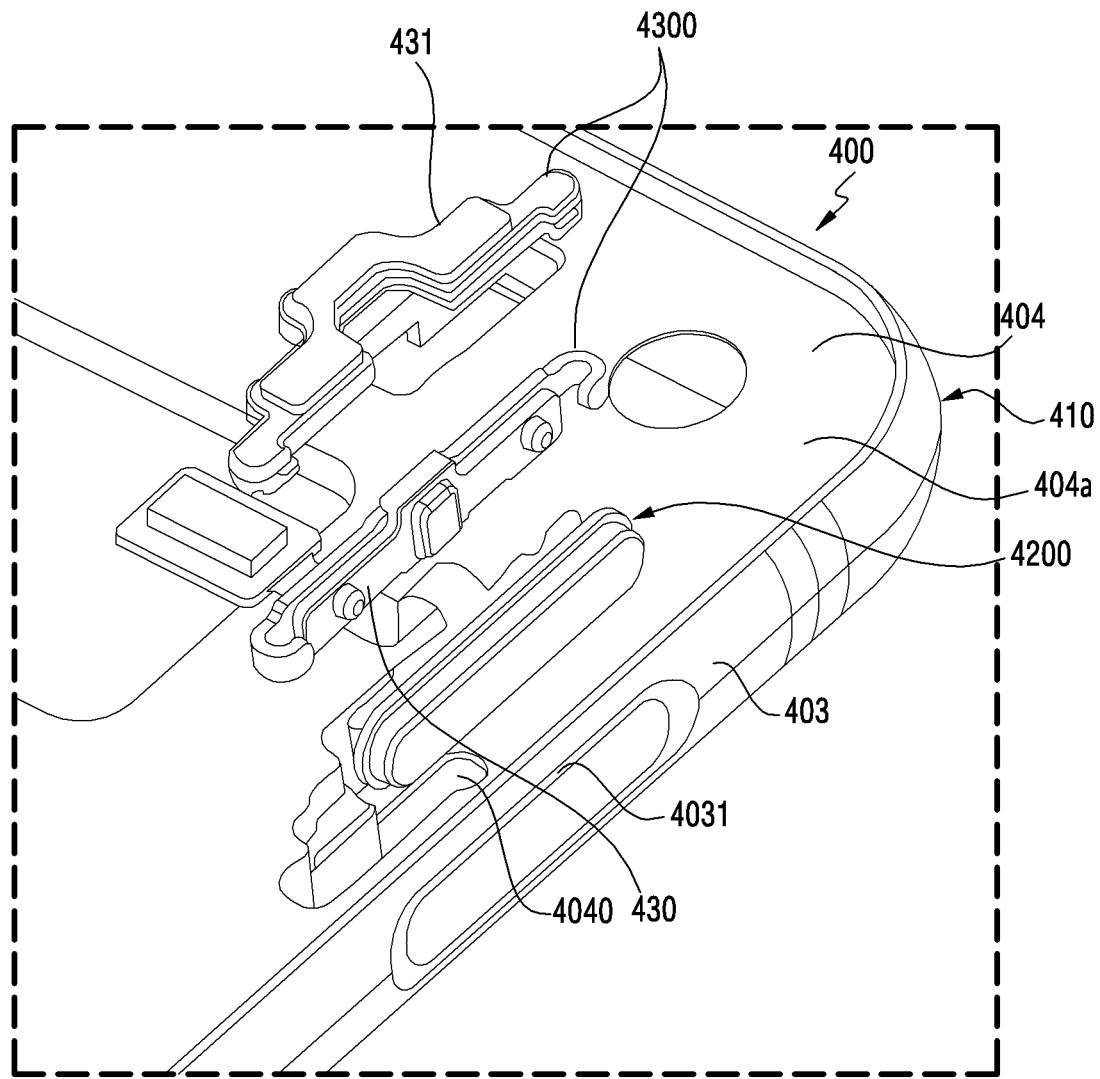
FIG. 7A is an enlarged view of a part of FIG. 6.
Figure 7B:
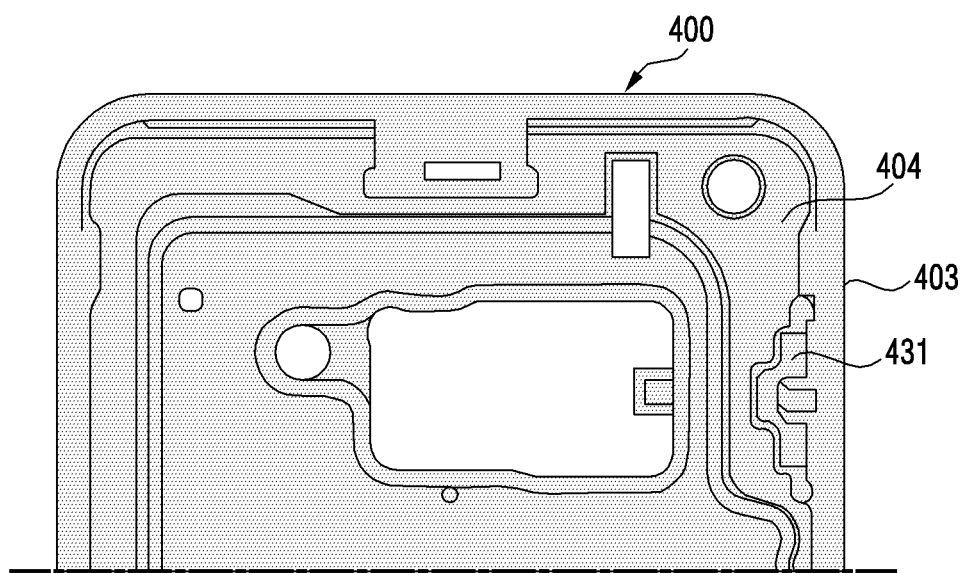
FIG. 7B is a plan view illustrating the state in which a front dummy is coupled to a mounting opening according to certain embodiments.

FIG. 6 is a perspective view illustrating a key assembly structure of an electronic device according to certain embodiments. FIG. 7A is an enlarged view of a part of FIG. 6. FIG. 7B is a plan view illustrating the state in which a front dummy is coupled to a mounting opening according to certain embodiments.

Referring to FIGS. 6 to 7B, in the electronic device 400 (e.g., the electronic device 100 illustrated in FIG. 1), the first plate 401 may be attached to the housing 410 by a waterproof tape B1. According to an embodiment, the waterproof tape B1 may perform a waterproofing function. The waterproof tape B1 may be attached to a seating face formed along the circumference of the housing 410. For example, the waterproof tape B1 may be implemented using a double-sided tape.

According to an embodiment, the housing 410 may include a support member 404, a side member 403, and a coupling structure thereof. According to an embodiment, the side member 403 may include a portion of the support member. According to an embodiment, the side member 403 may include an opening formed therein so as to expose at least a partial face of the sensor key assembly 4200 to the exterior of the device. According to an embodiment, the opening 4031 may expose to the exterior environment the sensing face of the fingerprint sensor for the sensor key assembly 4200.

According to an embodiment, the housing 410 may include a mounting opening 4040 recessed in the first face 404a of the support member 404 in the second direction (e.g., the second direction ② illustrated in FIG. 4). According to an embodiment, the mounting opening 4040 may be formed between the support member 404 and the side member 403 so as to accommodate the sensor key assembly 4200 and the key assembly structure 4300.

According to an embodiment, the key assembly structure 4300 may include a key bracket 430. The key bracket 430 may support the accommodated sensor key assembly 4200 when accommodated (e.g., disposed) in the mounting opening 4040. The sensor key assembly 4200 may be disposed in the opening 4031 formed in the side member, and the key bracket 430 may be disposed in the mounting opening 4040.

According to an embodiment, the key assembly structure 4300 may include a front dummy 431. According to an embodiment, the front dummy 431 may protect the accommodated sensor key assembly 4200. According to an embodiment, the front dummy 431 may be coupled to the mounting opening 4040 so as to cover one end of the mounting opening 4040. The front dummy 431 coupled to the mounting opening 4040 is illustrated in FIG. 7B.

Figure 8:
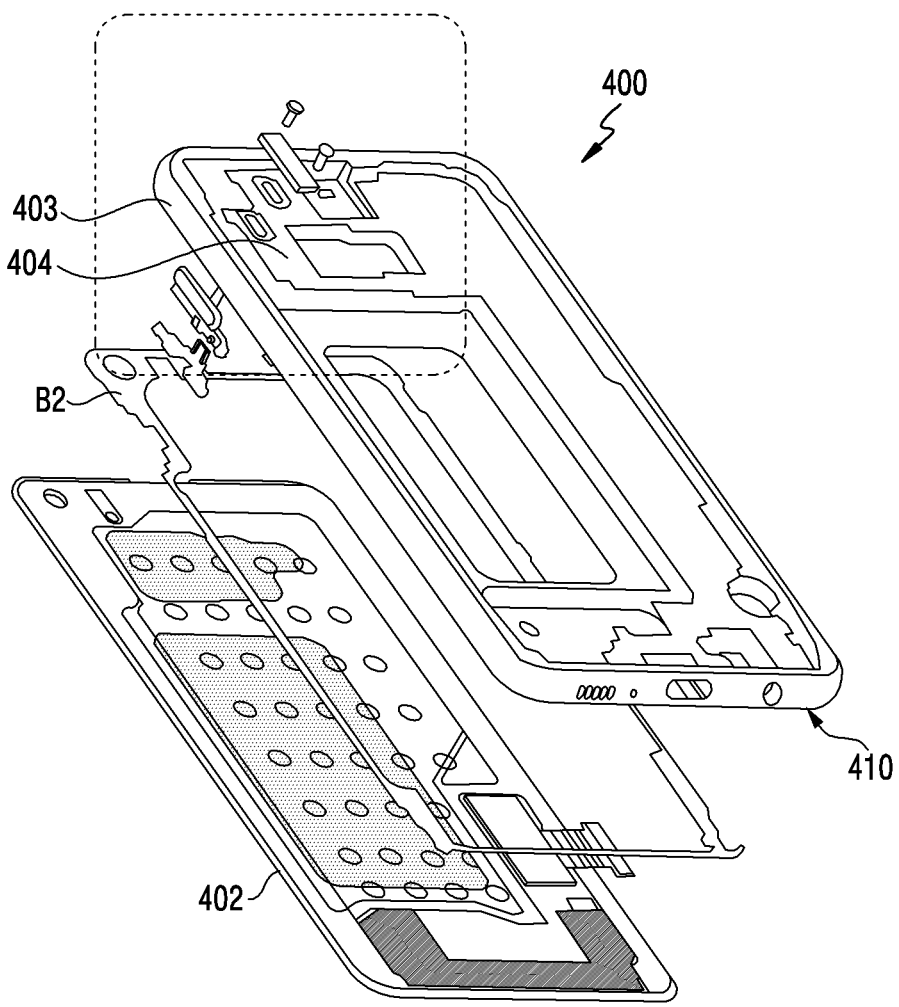
FIG. 8 is a perspective view illustrating a waterproof structure of an electronic device according to certain embodiments.
Figure 9A:
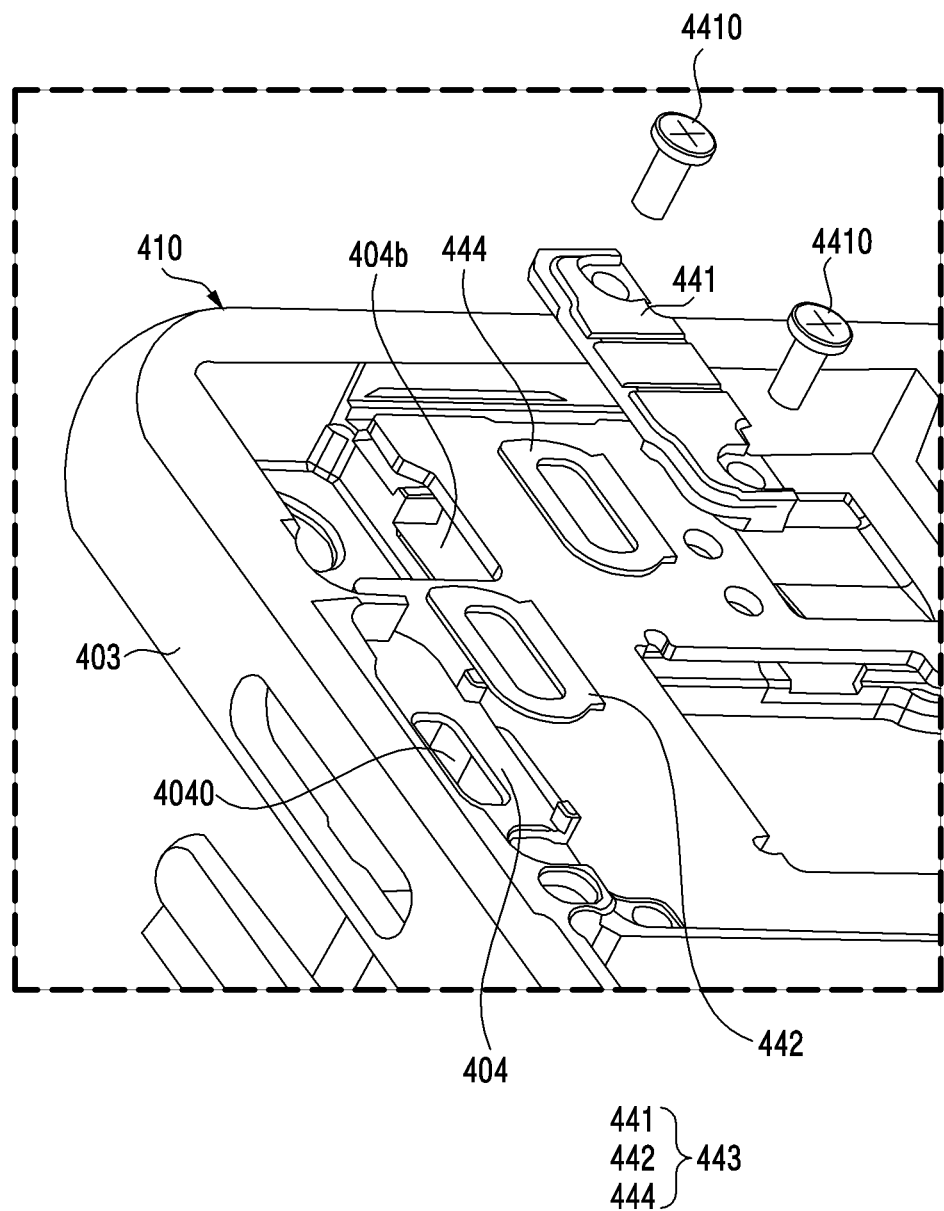
FIG. 9A is an enlarged view of a part of FIG. 8.
Figure 9B:
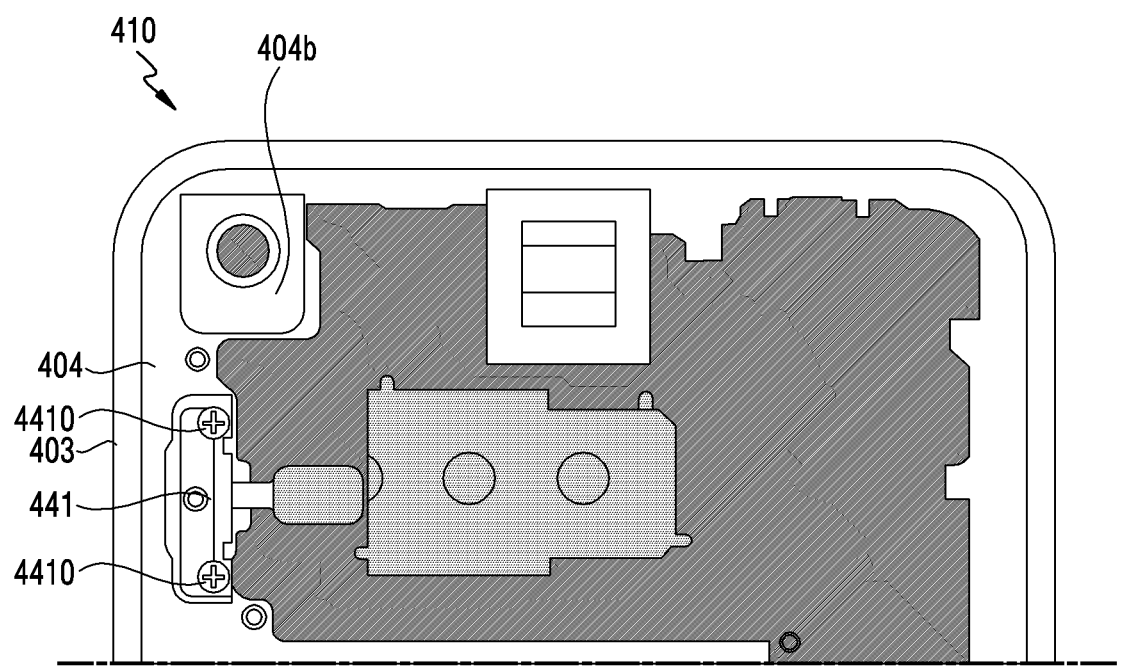
FIG. 9B is a plan view illustrating the state in which a waterproof structure according to certain embodiments is mounted.

FIG. 8 is a perspective view illustrating a waterproof structure of an electronic device according to certain embodiments. FIG. 9A is an enlarged view of a part of FIG. 8. FIG. 9B is a plan view illustrating the state in which a waterproof structure according to certain embodiments is mounted.

Referring to FIGS. 8 to 9B, the waterproof structure 443 according to an embodiment may be a sealing device that seals the mounting opening 4040 defined in the second face 404b of the support member 404, while allowing the flexible circuit board (e.g., the flexible circuit board 422 illustrated in FIG. 5B) of the sensor key assembly 4200 to pass through the mounting opening 4040. According to an embodiment, in the housing 410, because one end of the mounting opening 4040 is closed by the waterproof structure 443, first and second spaces (e.g., the first and second spaces s1 and s2 illustrated in FIG. 5B) in the housing 410 may be separated from each other. In other words, the waterproof structure 443 may serve to seal the second space (e.g., the second space s2 illustrated in FIG. 5B) from the first space (e.g., the first space s1 illustrated in FIG. 5B).

The waterproof structure 443 according to an embodiment may include a bottom dummy 441, first and second waterproof tapes 442 and 444, and at least one fastener 4410. According to an embodiment, the bottom dummy 441 is an injection molded member and is disposed in the second space s2. The bottom dummy may be fastened to a second face of the support member 404, which is oriented in the second direction ②, using a pair of fasteners 4410. For example, the fasteners 4410 may be screws.

According to an embodiment, the first and second waterproof tapes 442 and 444 may be attached between the bottom dummy 441 and the support member 404 so as to seal the gap between the bottom dummy 441 and the support member 404. According to an embodiment, the first waterproof tape 442 may be attached to the second face 404b of the support member 404. One side of the second waterproof tape 444 may be attached to the first waterproof tape 442, and the other side of the second waterproof tape 444 may be attached to the bottom dummy 441. Accordingly, for example, each of the first and second waterproof tapes 424 and 444 may be implemented using double-sided tape. According to an embodiment, the first waterproof tape 442 may be attached along the circumference of the mounting opening 4040 in a second face 404b. For example, the first and second waterproof tapes 424 and 444 may have the same shape.

According to an embodiment, the flexible circuit board 422 may pass through the gap defined between the first and second tapes 442 and 444. According to an embodiment, at least a portion of the flexible circuit board 422 may be attached to the first and second waterproof tapes 442 and 444, and after passing through the space defined between the first and second waterproof tapes 442 and 444, the flexible circuit board 422 may be directed to the PCB (e.g., the PCB illustrated in FIG. 5B). For example, each of the first and second waterproof tapes 424 and 444 may have a closed curve shape. For example, the closed curve shape may include a shape such as a circle, an ellipse, or a polygon.

According to an embodiment, the first and second waterproof tapes 442 and 444 may be prevented from curling from the second face 404b, to which they are attached, by the fastening structure of the bottom dummy 441. That is, the first and second waterproof tapes 442 and 444 may be maintained in the state of being compressed between the second face 404b and the bottom dummy 441 by the fastening structure of the bottom dummy 441. The state in which the waterproof structure 443 is mounted is illustrated in FIG. 9B.

Figure 10:
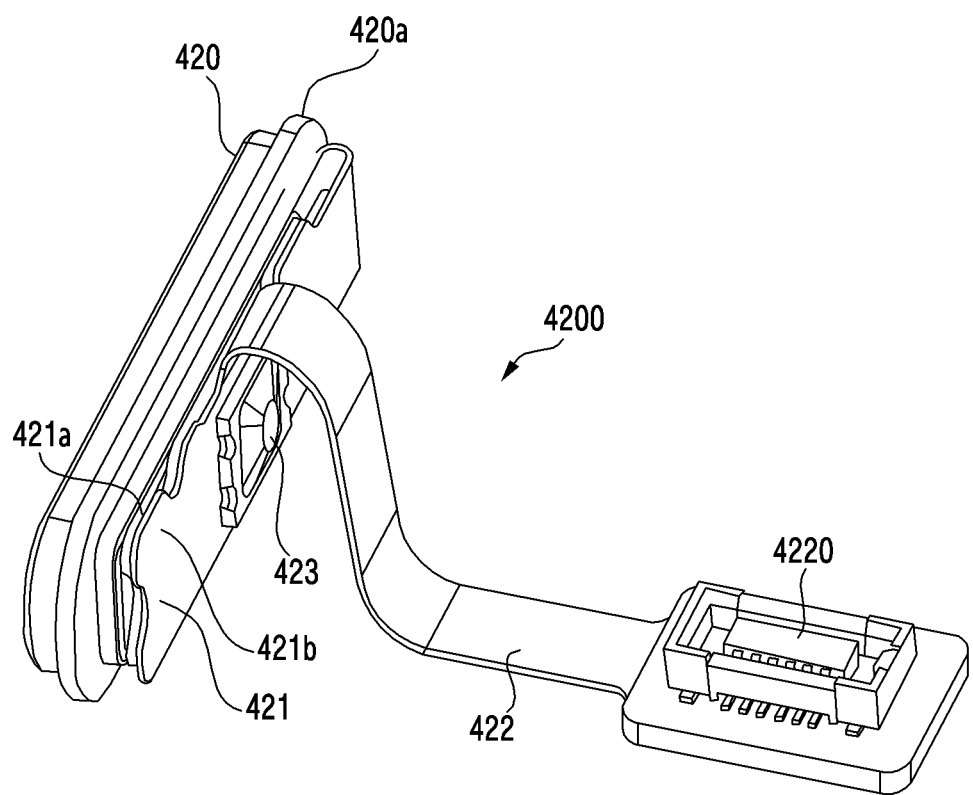
FIG. 10 is a perspective view illustrating a sensor key assembly according to certain embodiments.

FIG. 10 is a perspective view illustrating a sensor key assembly according to certain embodiments.

Referring to FIG. 10, the sensor key assembly 4200 according to an embodiment may include a sensor 420, a circuit board 421, and a dome switch 423. According to an embodiment, the sensor 420 includes, for example, a fingerprint sensor, and may be disposed such that at least a partial face thereof is exposed to the side member (e.g., the side member 403 illustrated in FIG. 4). The exposed partial face of the exposed fingerprint sensor 420 may be a surface that is capable of detecting the user's fingerprint. The circuit board 421 according to an embodiment may include a third face 421a and a fourth face 421b facing away from the third face 411. For example, the circuit board 421 may be made of a rigid material or a flexible material. According to an embodiment, the fingerprint sensor 420 may be mounted on the third face 421a of the circuit board 421, and the dome switch 423 may be disposed on the fourth face 421b of the circuit board 421. The fingerprint sensor 420 and the dome switch 423 may be opposite to each other.

According to an embodiment, the fingerprint sensor 420 may include a flange portion 420a that is assembled to the side member (e.g., the side member 403 illustrated in FIG. 4). According to an embodiment, the fingerprint sensor 420 is a side key of the electronic device (e.g., the electronic device 400 in FIG. 4), and may be operated as a physical key button that operates the dome switch as being pressed in the third direction (e.g., the third direction ③ illustrated in FIG. 5A).

According to an embodiment, the circuit board 421, to which the fingerprint sensor 420 is bonded, may be electrically connected to a PCB (e.g., the PCB illustrated in FIG. 5A) by the flexible circuit board 422 and the connector 4220. For example, the flexible circuit board 422 may include at least one bendable portion.

According to an embodiment, in the sensor key assembly 4200, the fingerprint sensor 420, the circuit board 421, the dome switch 423, and a portion of the flexible circuit board 422 may be disposed in the first space (e.g., the first space s1 illustrated in FIG. 5B), and the connector 4220 and the remaining portion of the flexible circuit board 422 may be disposed in the second space (e.g., the second space s2 illustrated in FIG. 5B). The flexible circuit board 422 may pass through a waterproof structure (e.g., the waterproof structure 443 illustrated in FIG. 5B).

Figure 11:
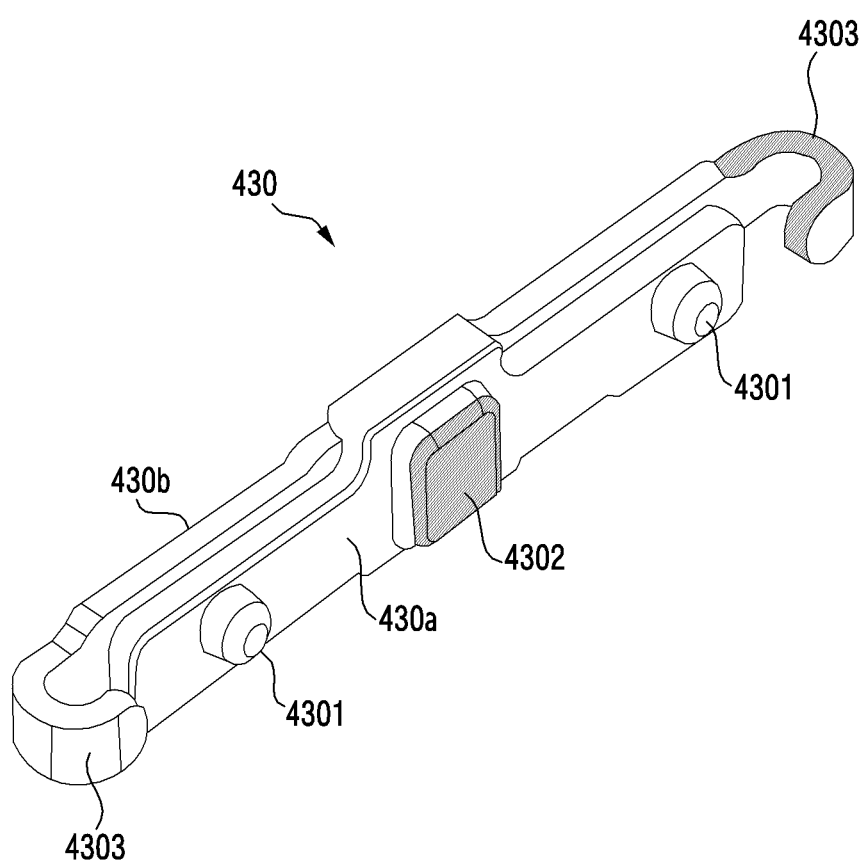
FIG. 11 is a perspective view illustrating a key bracket according to certain embodiments.

FIG. 11 is a perspective view illustrating a key bracket according to certain embodiments.

Referring to FIG. 11, a key assembly structure (e.g., the key assembly structure 4300 illustrated in FIG. 6) according to an embodiment is an assembly structure that includes a fingerprint sensor (e.g., the fingerprint sensor 420 illustrated in FIG. 10) mounted in a mounting opening (e.g., the mounting opening 4040 illustrated in FIG. 7A), enabling performance of a fingerprint sensor function, and a side key function may include a key bracket 430.

According to an embodiment, the key bracket 430 may include a fifth face 430*a* facing the fingerprint sensor (e.g., the fingerprint sensor 420 illustrated in FIG. 10) and a sixth face 430*b* facing away from the fifth face 430*a*. In addition, the fifth face 430*a* and the sixth face 430*b* of the key bracket 430 may be formed of different materials. For example, the fifth face 430*a* may be made of a synthetic resin material, and the sixth face 430*b* may be made a metal material. However, the material structure of the key bracket 430 is not limited thereto.

According to an embodiment, the key bracket 430 may further include a pair of first protrusions 4301 formed on the fifth face 430*a* and protruding toward the fingerprint sensor in order to prevent breakage of the dome switch (e.g., the dome switch 423 illustrated in FIG. 10). According to an embodiment, the key bracket 430 may further include a second protrusion 4302 formed between the first protrusions 4301 so as to click the dome switch (e.g., to provide a physical "clicking" action when the dome switch is activated). The first protrusions 4301 may protrude further toward the dome switch than the second protrusion 4302. According to an embodiment, the key bracket 430 may include a pair of guides 4303 formed in a bent shape at the opposite ends thereof, respectively, and assembled to a portion of the housing. According to an embodiment, each guide 4303 may have a shape bent toward the fingerprint sensor.

Figure 12A:
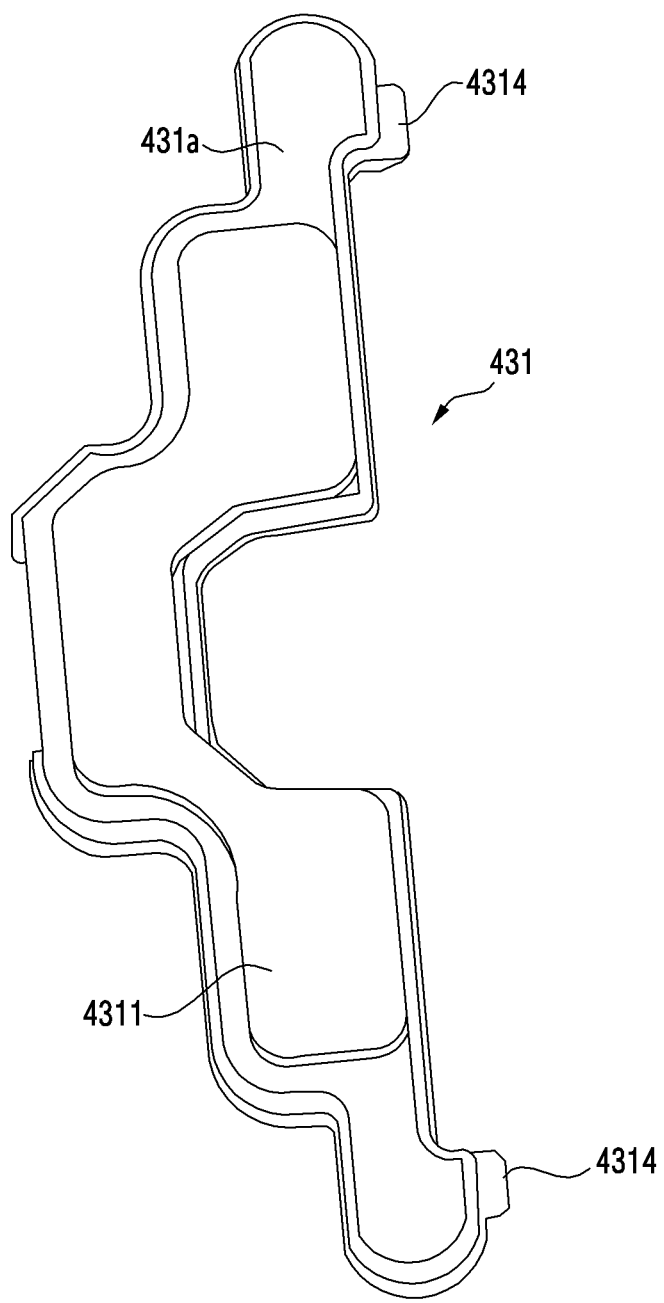
FIG. 12A is a perspective view illustrating a front dummy according to certain embodiments.
Figure 12B:
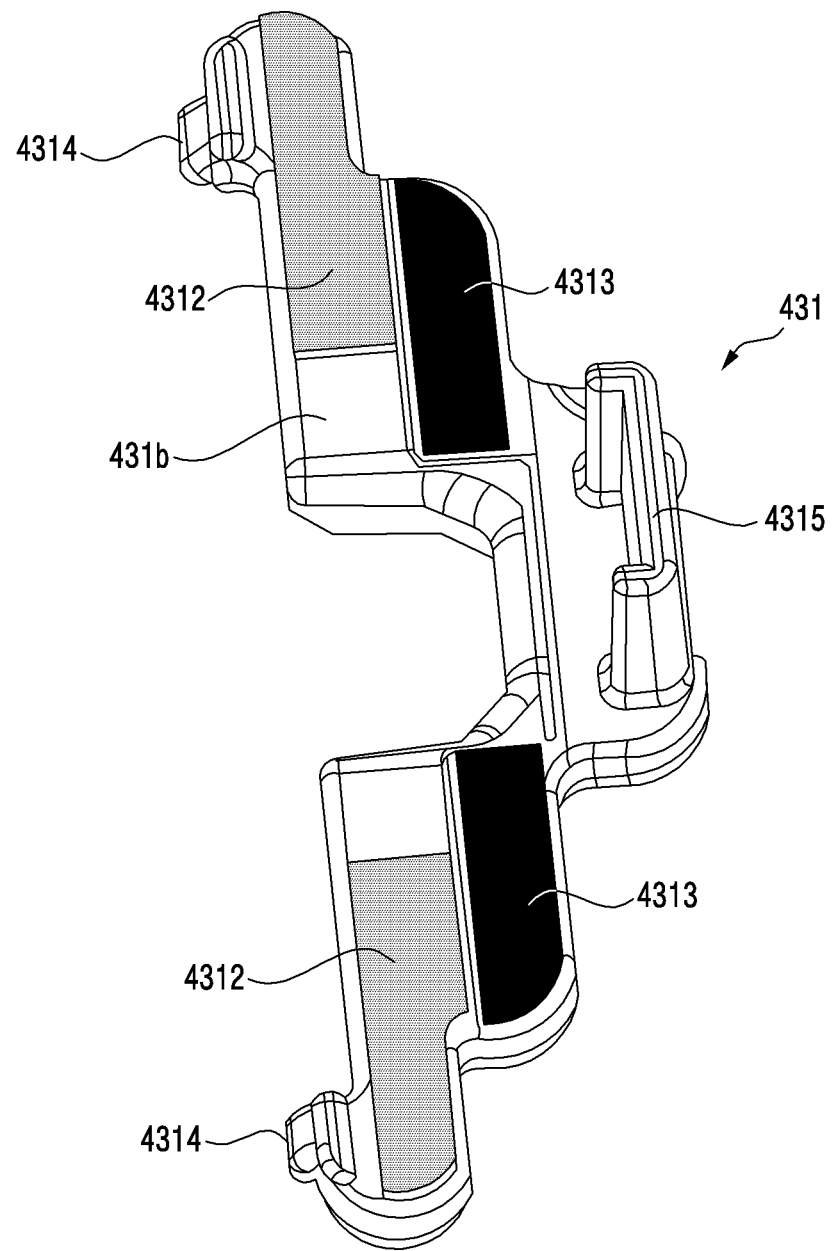
FIG. 12B is a perspective view illustrating a front dummy according to certain embodiments.

FIG. 12A is a perspective view illustrating a front dummy according to certain embodiments, and FIG. 12B is a perspective view illustrating a front dummy according to certain embodiments.

Referring to FIGS. 12A and 12B, according to an embodiment, a front dummy 431 may be a cover member that protects a sensor key assembly (e.g., the sensor key assembly 4200 illustrated in FIG. 7B) accommodated in a mounting opening (e.g., the mounting opening 4040 illustrated in FIG. 7B). According to an embodiment, the front dummy 431 may include a seventh face 431*a* oriented in a first direction (e.g., the first direction ① illustrated in FIG. 4) and an eighth face 431*b* oriented in a second direction (e.g., the second direction ② illustrated in FIG. 4) when coupled to the mounting opening. According to an embodiment, the front dummy 431 may further include at least one first layer 4311 attached to the seventh face 431*a* so as to prevent a display panel (e.g., the display panel 405 illustrated in FIG. 4B) from being damaged. For example, the first layer 4311 may include a sponge formed of a formed elastic resin material. The first layer 4311 may be disposed in close contact with the display panel so as to absorb shocks that would otherwise be received by the display panel. According to an embodiment, the first layer 4311 may be attached to remaining portions other than the opposite end portions of the seventh face 431*a*.

According to an embodiment, the front dummy 431 may further include one or more second layers 4312 attached to the eighth face 431*b* so as to prevent a key bracket (e.g., the key bracket 430 illustrated in FIG. 7A) from curling. According to an embodiment, the eighth face 431*b* of the front dummy 431 is disposed in close contact with the key bracket 430, thereby preventing the key bracket 430 accommodated in the mounting opening from curling in the first direction. For example, the second layers 4312 may include a sponge formed of a formed elastic resin material. According to an embodiment, the second layers 4312 may be attached to respective opposite end areas of the eighth face 431*b*, and may be symmetrically disposed. According to an embodiment, the front dummy 431 may further include third layers 4313, each attached to and assembled to a portion of the housing, in the vicinity of the second layer 4312. For example, the third layers 4313 may be implemented using adhesive tapes. The third layers 4313 may be disposed adjacent to the second layers 4312. According to an embodiment, the third layers 4313 may be attached to partial faces of a support member (e.g., the support member 404 illustrated in FIG. 7A) so as to fix the front dummy 431 to the partial faces of the support member. According to an embodiment, the third layers 4313 may be attached to the eighth face 431*b*, and may be symmetrically disposed.

According to an embodiment, the front dummy 431 may include coupling structures 4314 protruding from opposite ends thereof and coupled to portions of the side member (e.g., the side member 403 illustrated in FIG. 7A). For example, the coupling structure 4314 may include a pair of assembly hooks. Hereinafter, the coupling structure will be referred to as assembly hooks. The assembly hooks 4314 may protrude from respective opposite ends of the front dummy 431. The front dummy 431 may be coupled to an assembly hole (not illustrated) in the side member by the assembly hooks 4314, thereby holding the front dummy 431 to the side member. Each assembly hook 4314 may protrude in a third direction (e.g., the third direction ③ illustrated in FIG. 4).

According to an embodiment, the front dummy 431 may further include a protrusion structure 4315 so as to protect a flexible circuit board (e.g., the flexible circuit board illustrated in FIG. 5B) from being bent. The protrusion structure 4315 is a protrusion protruding from the eighth face 431*b* of the front dummy 431, and may be disposed to be oriented in a second direction (e.g., the second direction ② illustrated in FIG. 4) when the front dummy 431 is coupled to the mounting opening. According to an embodiment, the protrusion member 4315 may be formed adjacent to the second and third layers 4312 and 4313. When the front dummy 431 is assembled to the mounting opening, the second layer 4312, the third layer 4313, and the protruding structure 4315 may be closer to the fingerprint sensor (e.g., the fingerprint sensor 420 illustrated in FIG. 10) in that order.

Figure 13:
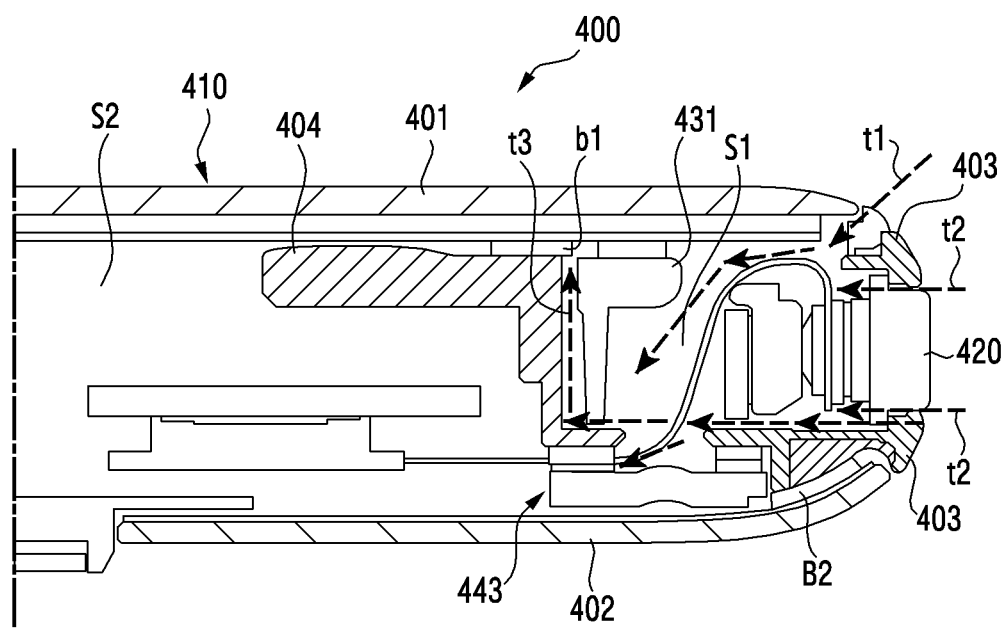
FIG. 13 is an example view illustrating moisture penetration paths in an electronic device according to certain embodiments.

FIG. 13 is an example view illustrating moisture penetration paths in an electronic device according to certain embodiments.

Referring to FIG. 13, in the housing 410 according to an embodiment, foreign matter, such as, for example, moisture, may penetrate into the first space s1 along a first path t1 due entrance through a first gap defined between the first plate 401 and the side member 403, and moisture may penetrate into the first space s1 along a second path t2 due to a second gap defined between the side member 403 and the fingerprint sensor 420. According to an embodiment, moisture may penetrate into a gap between the support member 404 and the bottom dummy 441 along a third path t3.

Due to a plurality of moisture penetration paths t1, t2, and t3, in certain embodiments of the disclosure the second space s2 in the housing 410 may be sealed by a plurality of waterproof tapes from moisture that has penetrated into the first space s1.

Figure 14:
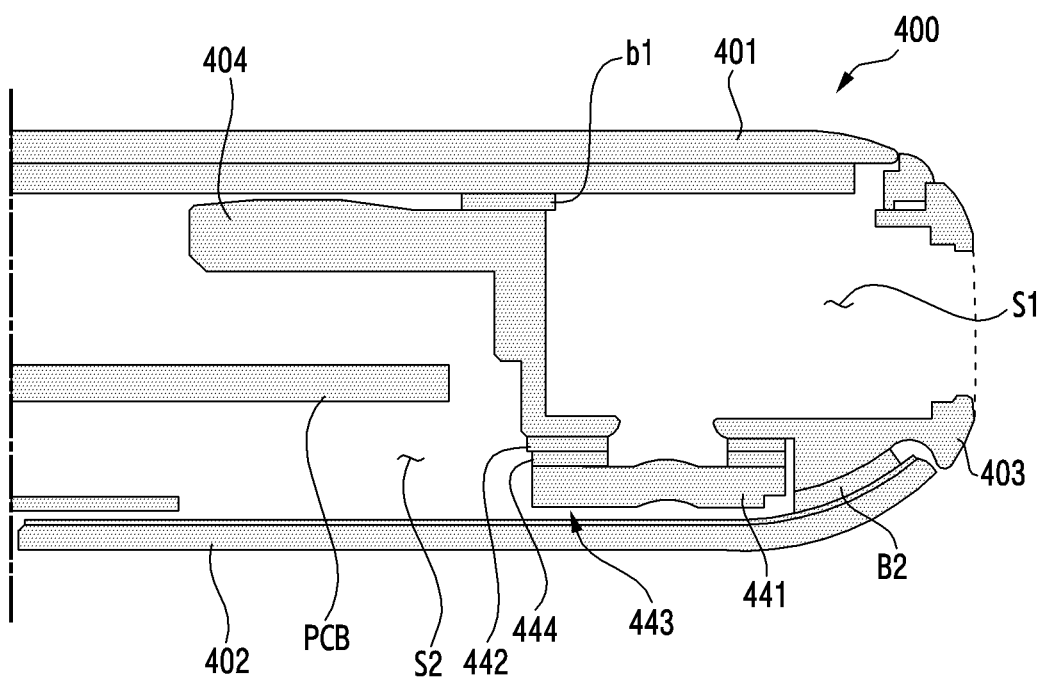
FIG. 14 is a cross-sectional view illustrating waterproof structures mounted in an electronic device according to certain embodiments.

FIG. 14 is a cross-sectional view illustrating waterproof structures mounted in an electronic device according to certain embodiments.

Referring to FIG. 14, an electronic device 400 according to an embodiment may include first and second spaces s1 and s2, which may be separated by a waterproof structure 443 (e.g., the waterproof structure 443 illustrated in FIG. 9A). The first space s1 may be a space in which a sensor key assembly 4200 is disposed, and the second space s2 may be a space in which a PCB is disposed. According to an embodiment, gaps and/or openings connected the first space s1 and the second space s2 may be sealed by the waterproof structure 443, and accordingly, the second space s2 may be sealed from the first space s1.

According to an embodiment, a waterproof tape b1 may be disposed between a first plate 401 and a support member 404 (e.g., a seating face of the support member), a waterproof tape B2 may be disposed between the second plate 402 and the side member 403, and first and second waterproof tapes 442 and 444 may be disposed between the support member 404 and the bottom dummy 441 so as to seal the second space s2.

Figure 15A:
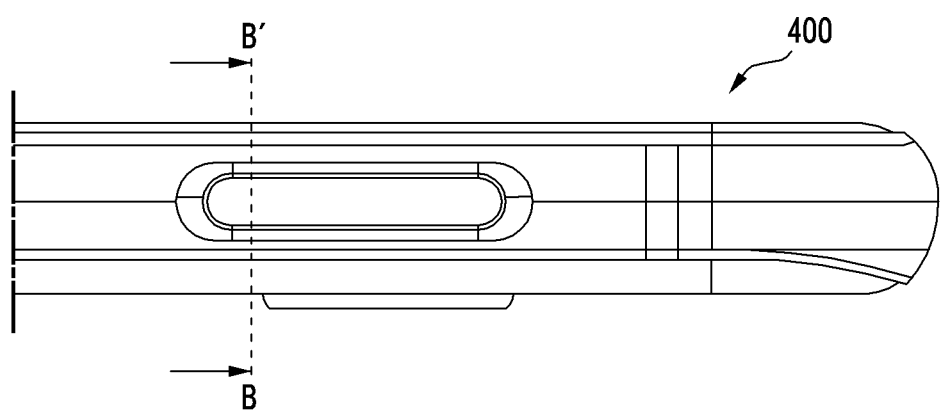
FIG. 15A is a side view illustrating a part of an electronic device according to certain embodiments.
Figure 15B:
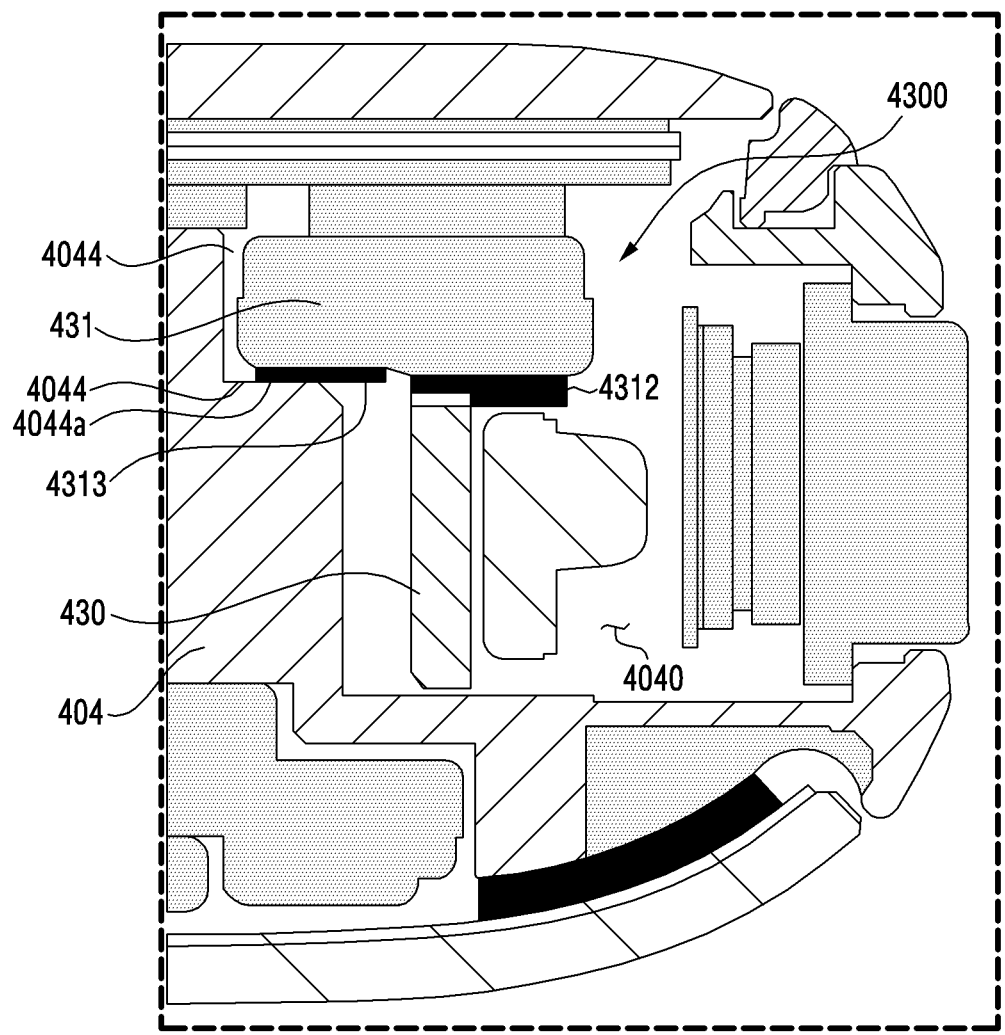
FIG. 15B is a cross-sectional view taken along line B-B' in FIG. 15A.

FIG. 15A is a side view illustrating a part of an electronic device according to certain embodiments. FIG. 15B is a cross-sectional view taken along line B-B' in FIG. 15A.

Referring to FIGS. 15A and 15B, the key assembly structure 4300 of the electronic device 400 (e.g., the electronic device 400 shown in FIG. 4) according to an embodiment may include a structure that prevents the key bracket 430 from curling. A curling phenomenon may occur in the key bracket 430 accommodated (e.g., disposed or mounted) in the mounting opening 4040 in the housing. In order to prevent the curling of the key bracket 430, a curling prevention layer 4312 (e.g., the second layer 4312 illustrated in FIG. 12B) may be attached to the front dummy 431. For example, the layer 4312 may be an elastic body, and may include a sponge formed of a formed resin material.

According to an embodiment, a stepped portion 4044 may be formed in the mounting opening 4040 formed in the support member 404, and an adhesive layer 4313 (e.g., the third layer 4313 illustrated in FIG. 12B) attached to the front dummy 431 may be attached to one face 4044a of the stepped portion 4044. By attachment between one face of the stepped portion 4044 and the adhesive layer 4313, one end of the front dummy 431 is able to be fixed to the support member 404, and the other end of the front dummy 431 is able to be fixed by an engagement structure (e.g., the assembly hook 4314 illustrated in FIG. 12B).

Figure 16:
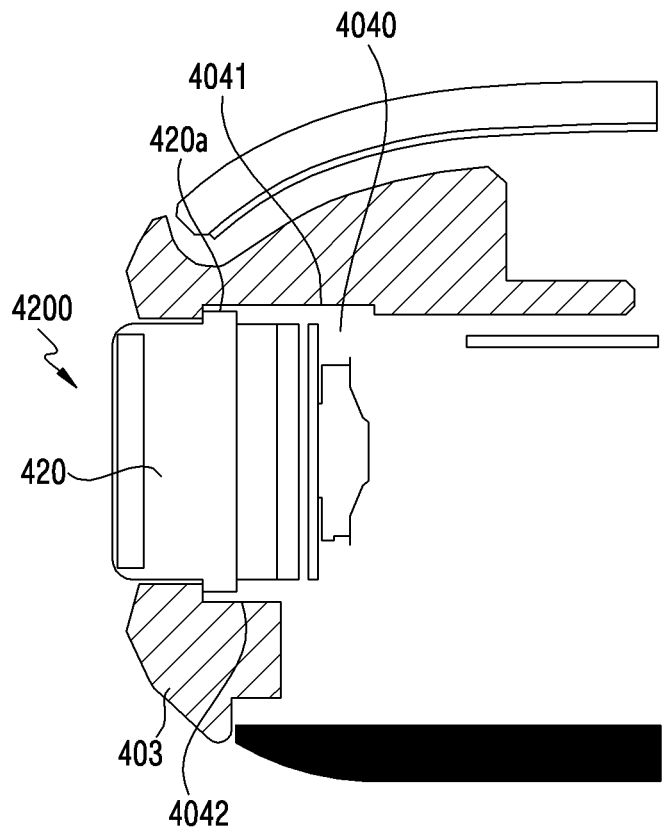
FIG. 16 is cross-sectional view illustrating an assembly structure of a fingerprint sensor according to certain embodiments.

FIG. 16 is a cross-sectional view illustrating an assembly structure of a fingerprint sensor according to certain embodiments.

Referring to FIG. 16, according to an embodiment, the sensor key assembly 4200 may include first and second undercut structures 4041 and 4042 formed on the side member 403 so as to be stably mounted over the metal side member 403 and the support member 404. The sensor key assembly 4200 may utilize a structure for inserting the sensor key assembly 4200 into the mounting opening 4040 defined in the housing in the vertical direction, and then for pushing the sensor key assembly 4200 in the outward direction of the housing in order to allow the sensor key assembly 4200 to be stably disposed in the mounting opening 4040, and to be restricted to movement in a third direction (e.g., the third direction ③ illustrated in FIG. 4). For this purpose, the side member 403 may be formed with the first and second undercut members 4041 and 4042. According to an embodiment, the first undercut structure 4041 may be formed on the first side wall of the side member 403 in a groove shape. The second undercut structure 4042 may be formed on the second side wall of the side member 403 in a groove shape. With the first and second undercut structures 4041 and 4042, the fingerprint sensor 420 of the sensor key assembly may be stably assembled and seated. According to an embodiment, the flange portion 420a of the fingerprint sensor 420 may restrictively move in the state of being inserted into the first and second undercut structures 4041 and 4042.

According to an embodiment, the first and second undercut structures 4041 and 4042 may be manufactured using a rotary tool (not illustrated).

Figure 17:
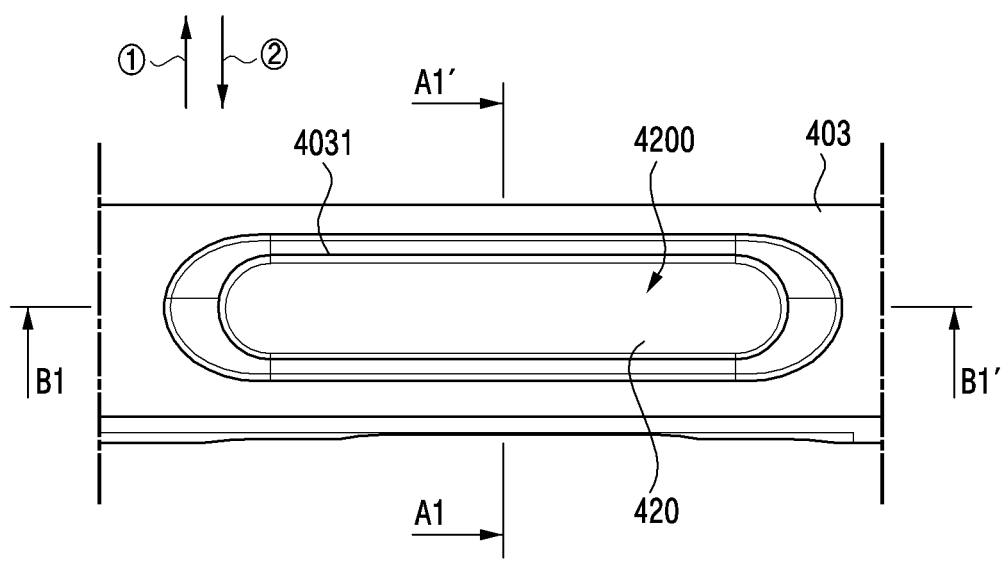
FIG. 17 is an enlarged view illustrating a sensor key assembly according to certain embodiments in the state of being assembled to a side member.
Figure 18A:
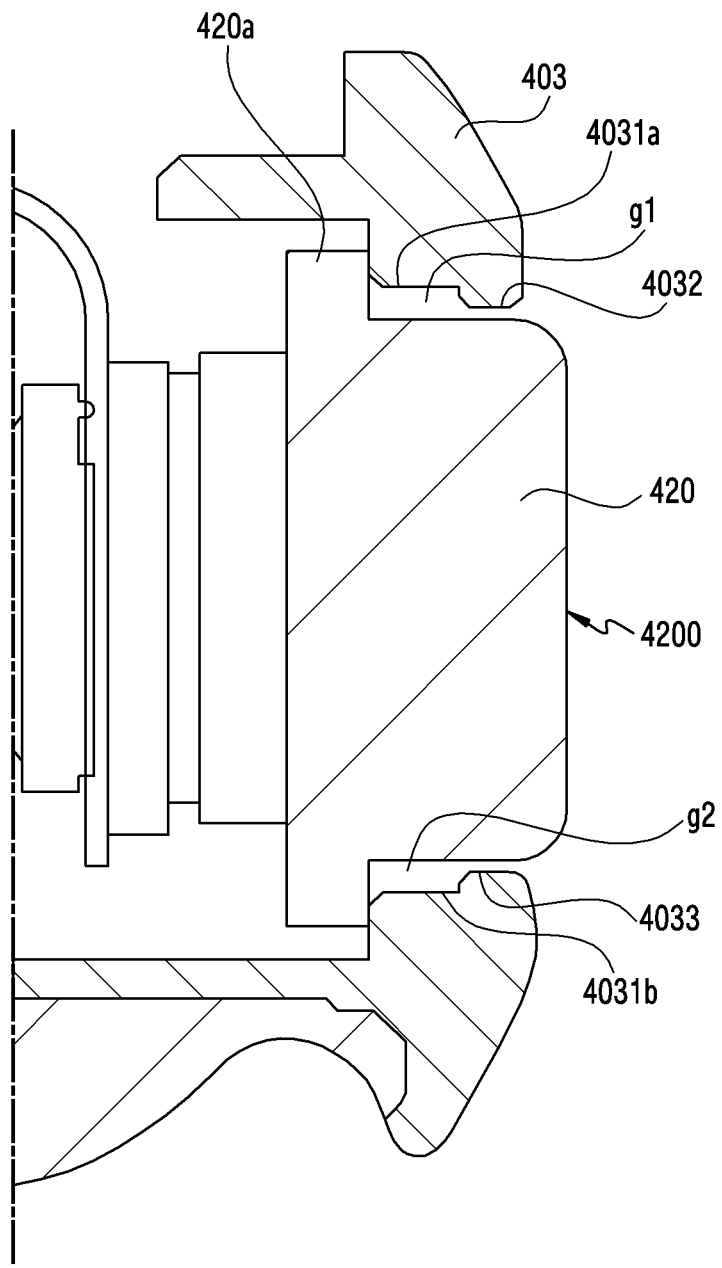
FIG. 18A is a cross-sectional view taken along line A1-A1' in FIG. 17.
Figure 18B:
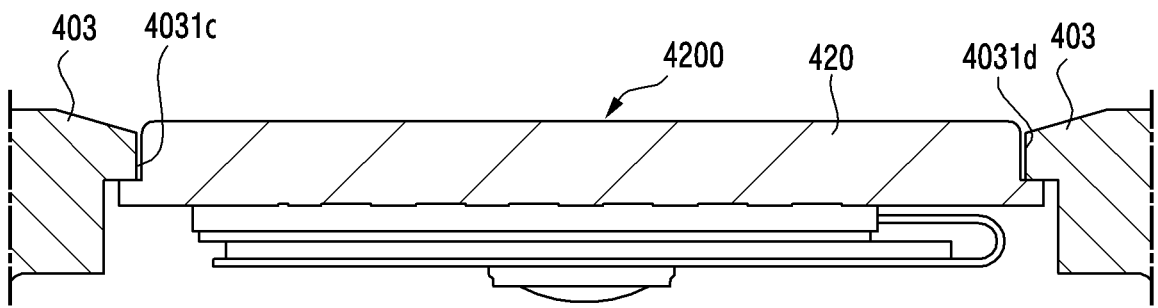
FIG. 18B is a cross-sectional view taken along line B1-B1' in FIG. 17.

FIG. 17 is an enlarged view illustrating a sensor key assembly according to certain embodiments, assembled to a side member. FIG. 18A is a cross-sectional view taken along line A1-A1' in FIG. 17. FIG. 18B is a cross-sectional view taken along line B1-B1' in FIG. 17.

Sticking prevention structures and foreign matter jamming prevention structures for the sensor key assembly will be described below with reference to FIGS. 17 to 18B.

In the sensor key assembly 4200 according to an embodiment, foreign matter may be introduced into the gap defined between the side member 403 in which an opening 4031 is formed and the fingerprint sensor key 420, due to contaminants present during the pushing operation of the physical fingerprint sensor key 420. If the gap were removed in order to prevent the possibility of entrance of foreign matter into the gap, the fingerprint sensor key 420 may "stick" during operation, and it may be inconvenient operate the fingerprint sensor key 420 (e.g., by pushing).

According to an embodiment, the key assembly structure may be provided with structures for preventing sticking of the fingerprint sensor key 420 and for preventing jams caused by foreign matter. According to an embodiment, the sticking prevention and foreign matter prevention structures for the fingerprint sensor key may be formed such that, when the sensor key assembly 4200 is assembled in the opening 4031, the gaps between the side member 403 and the left and right portions of the fingerprint sensor key 420 are removed, and the gaps between the side member 403 and the upper and lower portions of the fingerprint sensor key 420 generate first and second gaps g1 and g2.

According to an embodiment, the side member 403, in which the opening 4031 is formed, may include a first face 4031a, a second face 4031b facing the first face 4031a, a third face 4031*d* located between the first and second faces 4031*a* and 4031*b*, and a fourth face 4031*d* facing the third face 4031*c*. For example, the first face 4031*a* may be an upper face, the second face 4031*b* may be a lower face, the third face 4031*c* may be a left side face, and the fourth face 4031*d* may be a right side face.

According to an embodiment, the sticking prevention and foreign matter prevention structures for the fingerprint sensor key 420 may include a first stepped portion 4032 formed on the first face 4031*a* and a second stepped portion 4033 formed on the second face 4031*b* and facing the first stepped portion 4032. According to an embodiment, the fingerprint sensor key 420 may be disposed so as to have first and second gaps g1 and g2 with the first and second faces 4031*a* and 4031*b* by the first and second stepped portions 4032 and 4033, and so as to have no gap with the third and fourth faces 4031*c* and 4031*d*, that is without a gap.

Figure 19:
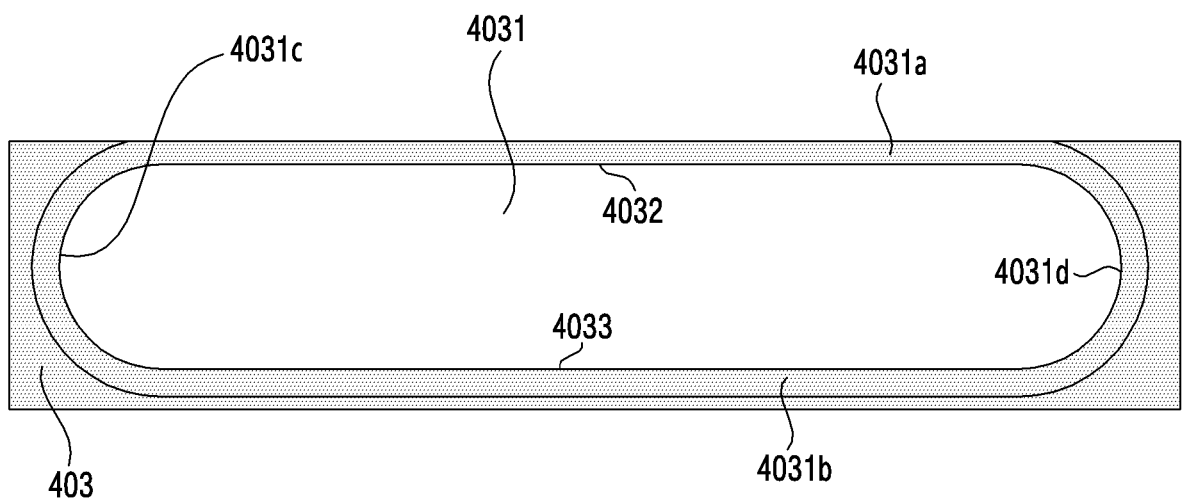
FIG. 19 is a perspective view illustrating a stepped portion formed in an opening of a side member according to certain embodiments of the disclosure.
Figure 20:
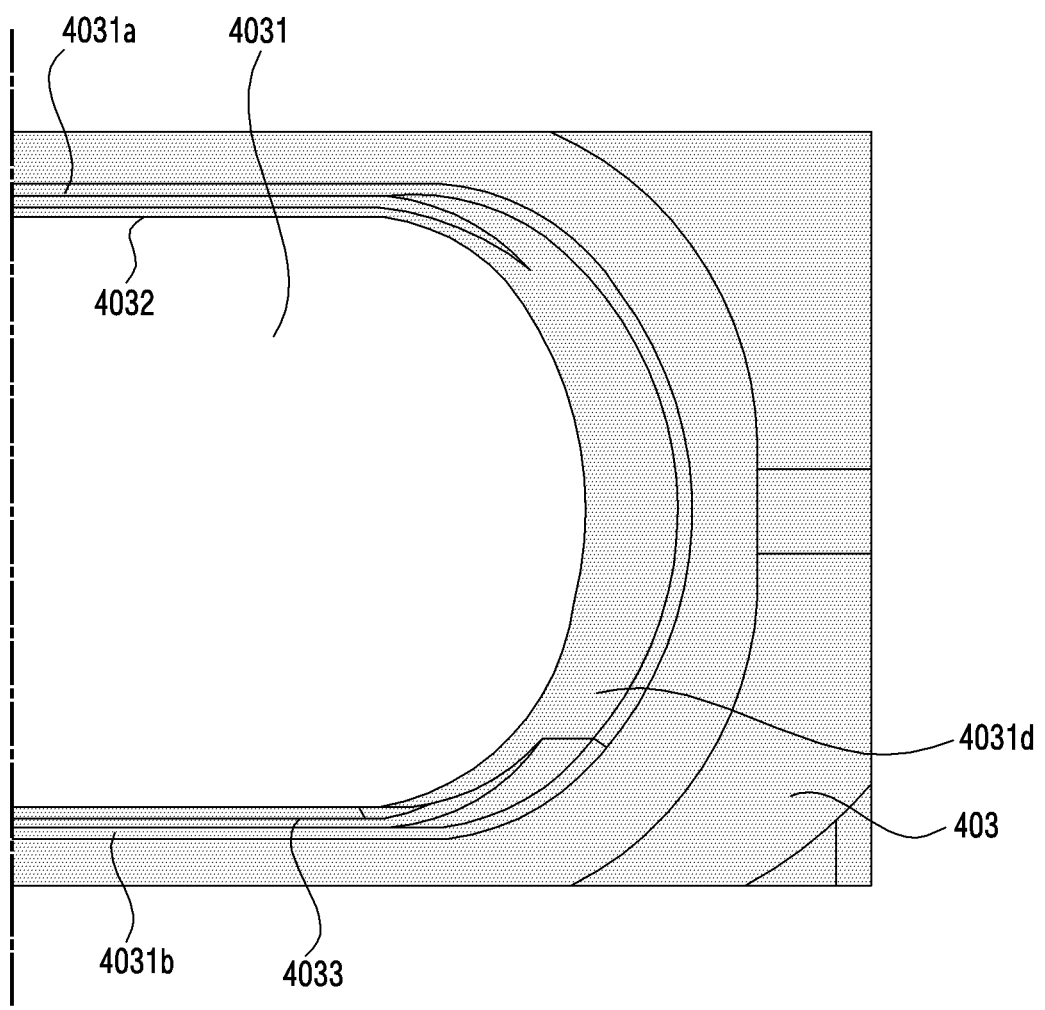
FIG. 20 is an enlarged view of the stepped portion illustrated in FIG. 19.

FIG. 19 is a perspective view illustrating a stepped portion formed in an opening of a side member according to certain embodiments of the disclosure. FIG. 20 is an enlarged view of the stepped portion illustrated in FIG. 19.

Referring to FIGS. 19 and 20, according to an embodiment, opposite end portions of the first stepped portion 4032 become gradually smaller in step shape as they progress toward the third and fourth faces 4031*c* and 4031*d*, and may terminate on the third and fourth faces 4031*c* and 4031*d*, respectively. According to an embodiment, opposite end portions of the second stepped portion 4033 become gradually smaller in step shape as they progress toward third and fourth faces 4031*c* and 4031*d*, and may terminate on the third and fourth faces 4031*c* and 4031*d*, respectively. According to an embodiment, a first gap (e.g., the first gap g1 illustrated in FIG. 18A) may be formed by the first stepped portion 4032, and a second gap (e.g., the second gap g2 illustrated in FIG. 18A) may be formed by the second stepped portion 4033. According to an embodiment, the first and second stepped portions 4032 and 4033 may be formed as to be symmetrical with each other.

According to an embodiment, the first and second faces 4031*a* and 4031*b* may be long, and the third and fourth faces 4031*c* and 4031*d* may be short. That is, the first and second faces 4031*a* and 4031*b* may be formed to be longer than the third and fourth faces 4031*c* and 4031*d*, respectively.

According to an embodiment, an electronic device (e.g., the electronic device 100 illustrated in FIG. 1 or the electronic device 400 in FIG. 4) may include: a housing (e.g., the housing 410 illustrated in FIG. 4) including a first plate (e.g., the first plate 401 illustrated in FIG. 4) oriented in a first direction (e.g., the first direction ① illustrated in FIG. 4), a second plate (e.g., the second plate 402 illustrated in FIG. 4) oriented in a second direction (e.g., the second direction ② illustrated in FIG. 4) that is opposite the first direction, and a side member (e.g., the side member 403 illustrated in FIG. 4) oriented in a third direction that is perpendicular to each of the first and second directions and surrounds at least a portion of a space between the first and second plates; a display panel (e.g., the display panel 405 illustrated in FIG. 5B) exposed to be visible through at least a portion of the first plate; a printed circuit board (e.g., the printed circuit board (PCB) illustrated in FIG. 5B) disposed between the display panel and the second plate; a support member (e.g., the support member 404 illustrated in FIG. 5B) having a first face 404*a* oriented in the first direction (e.g., the first direction ① illustrated in FIG. 4) and supporting the display panel and a second face 404*b* oriented in the second direction (e.g., the second direction ② illustrated in FIG. 4) and supporting the printed circuit board, the support member being coupled to at least a portion of the side member; a sensor key assembly (e.g., the sensor key assembly 4200 illustrated in FIG. 5*b*) disposed on at least a portion of the side member such that at least a partial face of a sensor is exposed to at least a portion of the side member, mounted on the first face of the support member, and electrically connected to the printed circuit board using a flexible circuit board; a key assembly structure (e.g., the key assembly structure 4300 illustrated in FIG. 5B) in which the sensor key assembly is disposed on the support member so as to enable key operation; and at least one waterproof structure (e.g., the waterproof structure 443 illustrated in FIG. 5B) mounted on the second face of the support member so as to seal a second space s2 in which the printed circuit board is located from a first space s1 in which the sensor key assembly is located.

According to an embodiment, the sensor key assembly (e.g., the sensor key assembly 4200 illustrated in FIG. 5B) may include a fingerprint sensor (e.g., the fingerprint sensor 420 illustrated in FIG. 5B) positioned such that at least a partial face thereof is exposed on the side member, a circuit board including a third face (e.g., the third face 421*a* illustrated in FIG. 10) and a fourth face (e.g., the fourth face 421*b* illustrated in FIG. 10) opposite the third face, the fingerprint sensor being mounted on the third face, and a dome switch (e.g., the dome switch 423 illustrated in FIG. 10) disposed on the fourth face of the circuit board.

The fingerprint sensor may be used as a physical key button that moves in the third direction so as to operate the dome switch.

According to an embodiment, the key assembly structure (e.g., the key assembly structure 4300 illustrated in FIG. 5B) may further include a mounting opening (e.g., the mounting opening 4040 illustrated in FIG. 5B) recessed in the second direction in the support member, and a key bracket (e.g., the key bracket 430 illustrated in FIG. 5B) accommodated in the mounting opening so as to support physical key operation of the fingerprint sensor.

According to an embodiment, the key bracket (e.g., the key bracket 430 illustrated in FIG. 5B) may include a fifth face (e.g., the fifth face 430*a* illustrated in FIG. 11) facing the fingerprint sensor, a pair of first protrusions (e.g., the pair of protrusions 4301 illustrated in FIG. 11) protruding from the fifth face toward the fingerprint sensor in order to prevent breakage of the dome switch, a second protrusion (e.g., the second protrusion 4302 illustrated in FIG. 11) formed between the first protrusions so as to click the dome switch, and a pair of guides (e.g., the guides 4303 illustrated in FIG. 11) respectively provided at opposite ends of the key bracket in a bent shape so as to assemble the key bracket to a portion of the housing.

According to an embodiment, the key assembly structure (e.g., the key assembly structure 4300 illustrated in FIG. 5B) may further include a front dummy (e.g., the front dummy 431 illustrated in FIG. 12A) coupled to the mounting opening so as to support the accommodated key bracket while closing the mounting opening.

According to an embodiment, the front dummy (e.g., the front dummy 431 illustrated in FIG. 12A) may further include a seventh face (e.g., the key bracket illustrated in FIG. 12A) oriented in the first direction, an eighth face (e.g., the key bracket illustrated in FIG. 12B) oriented in the second direction, and at least one first layer (e.g., the first layer 4311 illustrated in FIG. 12A) attached to the seventh face so as to prevent the display panel from being damaged.

According to an embodiment, the front dummy may further include at least one second layer (e.g., the second layer 4312 illustrated in FIG. 12A) attached to the eighth face so as to prevent the key bracket from curling, and a third layer (e.g., the third layer 4313 illustrated in FIG. 12B) attached to and assembled with a portion of the housing adjacent to the second layer.

According to an embodiment, the front dummy (e.g., the front dummy 431 illustrated in FIG. 12A) may include a pair of assembly hooks (e.g., the assembly hooks 4314 illustrated in FIG. 12A) respectively protruding from opposite ends and coupled to a portion of the side member in the third direction, and a protrusion structure (e.g., the protrusion structure 4315 illustrated in FIG. 11) formed on the eighth face and assembled to the mounting opening and disposed to be oriented in the second direction to protect the flexible circuit board from being bent.

According to an embodiment, the waterproof structure (e.g., the waterproof structure 443 illustrated in FIG. 5B) may further include a bottom dummy (e.g., the bottom dummy 41 illustrated in FIG. 5B) disposed in the second space and fastened to the second face of the support structure so as to close the mounting opening, and at least one waterproof tape (e.g., the waterproof tapes 442 and 444 illustrated in FIG. 5B) attached between the bottom dummy and the second surface of the support member so as to seal a gap between the bottom dummy and the second face.

The at least one waterproof tape (e.g., the waterproof tapes 442 and 444 illustrated in FIG. 5B) is prevented from curling from a state of being attached to the second face by a fastening structure of the bottom dummy.

According to an embodiment, the at least one waterproof tape (e.g., the waterproof tapes 442 and 444 illustrated in FIG. 5B) may include a first waterproof tape (e.g., the first waterproof tape 442 illustrated in FIG. 5B) attached to the second face of the support structure, and a second waterproof tape (e.g., the second waterproof tape 444 illustrated in FIG. 5B) attached to the first waterproof tape on one side thereof and attached to the bottom dummy on a remaining side thereof.

According to an embodiment, each of the first and second waterproof tapes (e.g., the waterproof tapes 442 and 444 illustrated in FIG. 5B) may be attached along a circumference of the mounting opening, and may be fastened to the bottom dummy so as to seal a gap between the first and second spaces (the first and second spaces s1 and s2 illustrated in FIG. 5B).

According to an embodiment, at least a portion of the flexible circuit board (e.g., the flexible circuit board 422 illustrated in FIG. 5B) accommodated in the mounting opening may be directed to the printed circuit board after passing through a space between the first and second waterproof tapes attached to each other.

According to an embodiment, each of the first and second waterproof tapes (e.g., the waterproof tapes 442 and 444 illustrated in FIG. 5B) may be formed in a closed curve shape.

According to an embodiment, the side member (e.g., the side member 403 illustrated in FIG. 4) may have an opening (e.g., the opening 4031 illustrated in FIG. 19) formed to assemble the sensor key assembly (e.g., the sensor key assembly 4200 illustrated in FIG. 5B) therein, the opening including a first face (e.g., the first face 4031a illustrated in FIG. 19), a second face (e.g., the second face 4031b illustrated in FIG. 19) facing the first face, a third face (e.g., the third face 4031c illustrated in FIG. 19) between the first and second faces, and a fourth face (e.g., the fourth face 4031d illustrated in FIG. 19) facing the third face, and the electronic device may further include a sensor key sticking prevention structure and a foreign matter jamming prevention structure between the side member having the opening formed therein and the sensor key of the sensor key assembly.

According to an embodiment, the structures may include a first stepped portion (e.g., the first stepped portion 4032 illustrated in FIG. 19) formed on the first face, and a second stepped portion (e.g., the second stepped portion 4033 illustrated in FIG. 19) formed on the second face and facing the first stepped portion, a first gap (e.g., the first gap g1 illustrated in FIG. 18A) may be formed between the first face and the upper portion of the sensor key, and a second gap (e.g., the second gap g2 illustrated in FIG. 18A) may be formed between the second face and the lower portion of the sensor key.

According to an embodiment, an electronic device (e.g., the electronic device 400 illustrated in FIG. 4) may include: a housing (e.g., the housing 410 illustrated in FIG. 4) including a first plate (e.g., the first plate 401 illustrated in FIG. 4) oriented in a first direction (e.g., the first direction ① illustrated in FIG. 4), a second plate (e.g., the second plate 402 illustrated in FIG. 4) oriented in a second direction (e.g., the second direction ② illustrated in FIG. 4) that is opposite the first direction, and a side member (e.g., the side member 403 illustrated in FIG. 4) oriented in a third direction (e.g., the third direction ③ illustrated in FIG. 5A) that is perpendicular to each of the first and second directions and surrounds at least a portion of a space between the first and second plates; a printed circuit board (e.g., the printed circuit board (PCB) illustrated in FIG. 5B) disposed between the first and second plates; a support member (e.g., the support member 404 illustrated in FIG. 5B) configured to support the printed circuit board and coupled to at least a portion of the side member; a fingerprint sensor key assembly (e.g., the fingerprint sensor key assembly 4200 illustrated in FIG. 5B) disposed such that a sensing face of the fingerprint sensor is exposed on at least a portion of the side member, and electrically connected to the printed circuit board using a flexible circuit board (e.g., the flexible circuit board 422 illustrated in FIG. 5B); and at least one waterproof structure (e.g., the waterproof structure 443 illustrated in FIG. 5B) mounted on the support member so as to seal a second space (e.g., the second space s2 illustrated in FIG. 5B), in which the printed circuit board is located, from a first space (e.g., the first space s1 illustrated in FIG. 5B), in which the fingerprint sensor key assembly is located.

According to an embodiment, the waterproof structure (e.g., the waterproof structure 443 illustrated in FIG. 5B) may include a bottom dummy (e.g., the bottom dummy 441 illustrated in FIG. 5B) disposed in the second space (e.g., the second space s2 illustrated in FIG. 5B) and fastened to the support structure (e.g., the support structure 404 illustrated in FIG. 5B), and at least one waterproof tape (e.g., the waterproof tapes 442 and 444 illustrated in FIG. 5B) attached between the bottom dummy and the support member so as to seal a gap between the bottom dummy and the support member.

According to an embodiment, the at least one waterproof tape may be prevented from curling from a state of being attached to the support member by a fastening structure of the bottom dummy.

According to an embodiment, the at least one waterproof tape (e.g., the waterproof tapes 442 and 444 illustrated in FIG. 5B) may include a first waterproof tape (e.g., the first waterproof tape 442 illustrated in FIG. 5B) attached to the support structure (e.g., the support structure 404 illustrated in FIG. 5B) and a second waterproof tape (e.g., the second waterproof tape 444 illustrated in FIG. 5B) attached to the first waterproof tape on one side and attached to the bottom dummy on a remaining side.

According to an embodiment, at least a portion of the flexible circuit board (e.g., the flexible circuit board 422 illustrated in FIG. 5B) accommodated in the mounting opening is directed to the printed circuit board after passing through a space between the first and second waterproof tapes (e.g., the first and second waterproof tapes 442 and 444 illustrated in FIG. 5B) attached to each other.

Meanwhile, the example embodiments disclosed in the specification and drawings are merely presented to easily describe the technical contents of the disclosure and help with the understanding of the disclosure and are not intended to limit the disclosure. Therefore, all changes or modifications derived from the technical idea of the disclosure as well as the embodiments described herein should be interpreted to belong to the disclosure.

What is claimed is:

1. An electronic device, comprising:
    a housing including a first plate oriented in a first direction, a second plate oriented in a second direction opposite the first direction, and a side member oriented in a third direction that is perpendicular to both the first and second directions, the side member surrounding at least a portion of a space defined between the first and second plates;
    a display panel visible through at least a portion of the first plate;
    a printed circuit board disposed between the display panel and the second plate;
    a support member having a first face oriented in the first direction and supporting the display panel, and a second face oriented in the second direction and supporting the printed circuit board, the support member coupled to at least a portion of the side member;
    a sensor key assembly disposed on at least a portion of the side member such that at least a partial face of a sensor of the sensor key is exposed to the at least the portion of the side member, mounted on the first face of the support member, and electrically connected to the printed circuit board using a flexible circuit board;
    a key assembly structure including the sensor key assembly disposed on the support member, so as to enable operation of the sensor key; and
    at least one waterproof structure mounted on the second face of the support member sealing a second space defined in the housing in which the printed circuit board is located, the second space sealed from a first space defined in the housing in which the sensor key assembly is located.

2. The electronic device of claim 1, wherein the sensor key assembly includes:
    a fingerprint sensor, wherein at least a partial face of the fingerprint sensor is exposed on the side member;
    a circuit board including a third face and a fourth face opposite the third face, the fingerprint sensor mounted on the third face; and
    a dome switch disposed on the fourth face of the circuit board,
    wherein the fingerprint sensor includes a physical key button that is moveable in the third direction to activate the dome switch.

3. The electronic device of claim 2, wherein the key assembly structure further includes:
    a mounting opening defined in the support member, the mounting opening recessed in the second direction; and
    a key bracket disposed in the mounting opening and supporting physical activation of the fingerprint sensor.

4. The electronic device of claim 3, wherein the key bracket includes:
    a fifth face oriented as to face the fingerprint sensor;
    a pair of first protrusions protruding from the fifth face towards the fingerprint sensor, obstructing breakage of the dome switch;
    a second protrusion formed between the first protrusions, providing a physical click responsive to activation of the dome switch; and
    a pair of guides respectively provided at opposite ends of the key bracket in a bent shape, which guide coupling of the key bracket to a portion of the housing.

5. The electronic device of claim 3, wherein the key assembly structure further includes:
    a front dummy coupled to the mounting opening, the front dummy supporting the key bracket and closing the mounting opening.

6. The electronic device of claim 4, wherein the front dummy further includes:
    a seventh face oriented in the first direction;
    an eighth face oriented in the second direction; and
    at least one first layer attached to the seventh face protecting the display panel from damage.

7. The electronic device of claim 6, wherein the front dummy further includes:
    at least one second layer coupled to the eighth face preventing curling of the key bracket; and
    a third layer coupled to a portion of the housing adjacent to the second layer.

8. The electronic device of claim 7, wherein the front dummy includes:
    a pair of assembly hooks protruding from opposite ends of the front dummy, the pair of assembly hooks coupled to a portion of the side member in the third direction; and
    a protrusion structure formed on the eighth face and coupled to the mounting opening, the protrusion structure oriented in the second direction to protect the flexible circuit board from bending.

9. The electronic device of claim 3, wherein the waterproof structure further includes:
    a bottom dummy disposed in the second space and fastened to the second face of the support member so as to close the mounting opening; and
    at least one waterproof tape attached between the bottom dummy and the second face of the support member, sealing a gap between the bottom dummy and the second face, and
    wherein the at least one waterproof tape is prevented from curling while attached to the second face by a fastening structure of the bottom dummy.

10. The electronic device of claim 9, wherein the at least one waterproof tape includes:
    a first waterproof tape attached to the second face of the support member; and
    a second waterproof tape that is attached to the first waterproof tape via a first side of the second waterproof tape, and attached to the bottom dummy via a second side of the second waterproof tape.

11. The electronic device of claim 10, wherein each of the first and second waterproof tapes is attached along a circumference of the mounting opening, and is fastened to the bottom dummy so as to seal a gap between the first and second spaces.

12. The electronic device of claim 10, wherein at least a portion of the flexible circuit board accommodated in the mounting opening extends towards the printed circuit board and passes through a space between the first and second waterproof tapes.

13. The electronic device of claim 10, wherein each of the first and second waterproof tapes is formed in a closed curve shape.

14. The electronic device of claim 1, wherein the side member defines an opening in which the sensor key is assembled, the opening including a first face, a second face facing the first face, a third face disposed between the first and second faces, and a fourth face facing the third face, and the electronic device further comprises:
 a sensor key sticking prevention structure and a foreign matter jamming prevention structure disposed between the side member having the opening formed therein, and the sensor key of the sensor key assembly.

15. The electronic device of claim 14, wherein the structures include:
 a first stepped portion formed on the first face; and
 a second stepped portion formed on the second face and facing the first stepped portion, and
 wherein a first gap is formed between the first face and an upper portion of the sensor key, and a second gap is formed between the second face and a lower portion of the sensor key.

16. An electronic device, comprising:
 a housing including a first plate oriented in a first direction, a second plate oriented in a second direction that is opposite the first direction, and a side member oriented in a third direction that is perpendicular to both of the first and second directions, the side member surrounding at least a portion of a space defined between the first and second plates;
 a printed circuit board disposed between the first and second plates;
 a support member supporting the printed circuit board and coupled to at least a portion of the side member;
 a fingerprint sensor key assembly disposed such that a sensing face of the fingerprint sensor is exposed on at least a portion of the side member, and electrically connected to the printed circuit board using a flexible circuit board; and
 at least one waterproof structure mounted on the support member sealing a second space in which the printed circuit board is located from a first space in which the fingerprint sensor key assembly is located.

17. The electronic device of claim 16, wherein the waterproof structure includes:
 a bottom dummy disposed in the second space and fastened to the support structure; and
 at least one waterproof tape disposed between the bottom dummy and the support member to seal a gap between the bottom dummy and the support member.

18. The electronic device of claim 17, wherein the at least one waterproof tape is prevented from curling by attachment to the support member via a fastening structure of the bottom dummy.

19. The electronic device of claim 17, wherein the at least one waterproof tape includes:
 a first waterproof tape attached to the support structure; and
 a second waterproof tape attached to the first waterproof tape on one side of the second waterproof tape, and attached to the bottom dummy on a remaining side of the second waterproof tape.

20. The electronic device of claim 19, wherein at least a portion of the flexible circuit board disposed in the mounting opening extends towards the printed circuit board after passing through a space between the first and second waterproof tapes.

* * * * *